(12) United States Patent
Miyagi et al.

(10) Patent No.: US 6,293,742 B1
(45) Date of Patent: Sep. 25, 2001

(54) MACHINING CENTER, CONTOURING PROCESS, AND TOOL SUPPORTING MECHANISM

(75) Inventors: Tomoyoshi Miyagi; Fujio Nonomura; Noriyoshi Katoh; Hiroki Nomura; Kazushige Nakatsuka; Katsutoshi Yamauchi; Kouji Ujihashi, all of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/447,236

(22) Filed: Nov. 23, 1999

(30) Foreign Application Priority Data

| Nov. 24, 1998 | (JP) | 10-333140 |
| Nov. 24, 1998 | (JP) | 10-333141 |
| Nov. 24, 1998 | (JP) | 10-333142 |
| Nov. 24, 1998 | (JP) | 10-333143 |
| Nov. 24, 1998 | (JP) | 10-333144 |

(51) Int. Cl.[7] ............................. B23C 9/00; B23B 41/12; B23B 35/00
(52) U.S. Cl. ................... 409/132; 29/40; 408/1; 408/234; 408/238; 409/232; 409/235
(58) Field of Search ................... 409/219, 224, 409/225, 212, 202, 235, 231, 204, 205, 209, 165, 163, 131, 132; 408/234, 235–238; 29/40, 26.17

(56) References Cited

U.S. PATENT DOCUMENTS

| 4,484,387 | * | 11/1984 | Nachmany | 409/219 X |
| 4,797,991 | * | 1/1989 | Yamaguchi et al. | 409/219 X |
| 5,735,029 | * | 4/1998 | Panetta | 29/40 |
| 5,938,577 | * | 8/1999 | Lindem | 409/212 X |
| 6,013,016 | * | 1/2000 | Irvine et al. | 402/234 |

FOREIGN PATENT DOCUMENTS

| 613848 | | 12/1948 | (GB) . | |
| 61-188011 | | 8/1986 | (JP) . | |
| 62-102942 | * | 5/1987 | (JP) | 408/234 |
| 63-140330 | | 9/1988 | (JP) . | |
| 2 292158 | * | 12/1990 | (JP) | 408/234 |
| 3-264201 | * | 11/1991 | (JP) | 408/234 |
| 6-320312 | * | 11/1994 | (JP) | 408/234 |
| 8-52641 | | 2/1996 | (JP) . | |

* cited by examiner

Primary Examiner—William Briggs
(74) Attorney, Agent, or Firm—Arent Fox Kintner Plotkin & Kahn

(57) ABSTRACT

A tool is rotated by a spindle mounted on a Z-axis table carried on a column and moved in the direction of a Z-axis to process a workpiece, while moving an X-axis table supported on a column rising from a bed in the direction of an X-axis and moving a Y-axis table supported on the X-axis table in the direction of a Y-axis to move the workpiece supported on the Y-axis. By controlling the movement of the X-axis and Y-axis tables in a contouring manner to move the workpiece along any path, holes having various sizes and shapes can be made by one type of the tool. Moreover, the wear of a cutting blade of the tool can be compensated by correcting the path of movement of the workpiece.

5 Claims, 28 Drawing Sheets

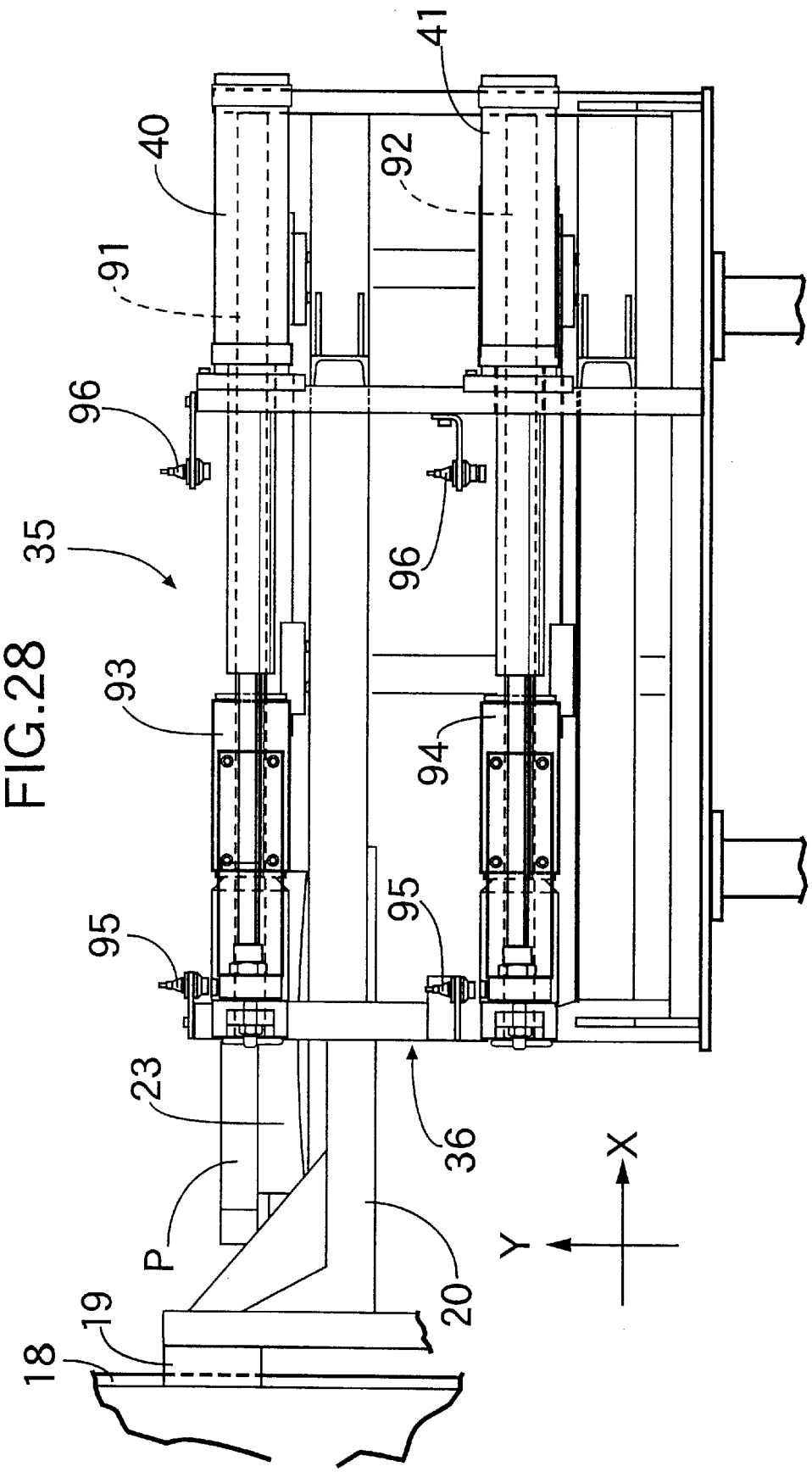

MACHINING CENTER, CONTOURING PROCESS, AND TOOL SUPPORTING MECHANISM

BACKGROUND OF THE INVENTION

1. Field of the Invention

The present invention relates to a machining centre for processing a workpiece with a tool supported on a spindle and rotated, and a contouring process using the machining centre, as well as structures of various sections of the machining centre.

2. Description of the Related Art

There is a machine tool conventionally known from Japanese Patent Application Laid-Open No. 61-188011, which is used when a plurality of crankshaft supporting holes provided in a cylinder block are made simultaneously by boring, or when a plurality of cam shaft supporting holes provided in a cylinder head are made simultaneously by boring. This machine tool is designed, so that inner peripheral surfaces of a plurality of bottom holes in a workpiece are bored by a plurality of cutting blades provided at predetermined distances on a shaft-shaped tool body of a tool by inserting the cutting blades into the bottom holes, while rotating the tool.

In the above known machine tool, the inside diameter of the hole being made by one type of tool is limited to the one type. For this reason, there is a problem that if an attempt is made to make a plurality of types of holes having different inside diameters, a large number of tools are required, resulting in an increase in cost. Another problem is that if the cutting blades of the tool become worn, the inside diameter of the hole processed is smaller than a desired size, and for this reason, the life of the tool is limited significantly. Moreover, when a tail support is supported at an upper end of a tail-support supporting member rising from the bed, in a case where the level of a spindle from a bed has been raised due to the supporting of the spindle on the column rising from the bed, the rigidity of the tail-support supporting member itself is insufficient and hence, the tail support may be moved by a reaction force to the processing, whereby the free end of the tool cannot be supported with good accuracy in some cases.

There is also a tool changer known from, for example, Japanese Patent Application Laid-Open No. 8-52641, which is designed, so that a tool can be grasped by each of a plurality of chucks mounted at predetermined distances on a circulating endless chain, and the delivery of the tool is conducted between any of the chucks and a spindle of a machine tool.

When the tool is grasped by the chuck mounted on the endless chain of the tool changer and driven in a circulatory movement, it is necessary to lock the chuck into a non-openable state in order to prevent the dropping of the tool. In addition, when the delivery of the tool is conducted between the chuck and the spindle, it is necessary to unlock the chuck. For this purpose, if a special actuator is provided in a tool delivery position to lock and unlock the chuck, the following problem arises: the number of parts is increased to cause an increase in cost.

In a Curvic coupling device (Curvic: trademark) for indexing a turntable rotatably carried on a base through a bearing and positioned radially, to a predetermined rotational angle to position the turntable, when a coupling member fixed to the base and a coupling member fixed to the turntable are integrally coupled to each other by a coupling member mounted on the base for advancing and retracting movement, the turntable is aligned with respect to the base by an aligning effect applied to between the coupling members each having radial teeth. When the turntable has been positioned radially with respect to the base by a bearing at this time, there is a possibility that the aligning effect possessed by the bearing itself and the aligning effect of the Curvic coupling, interfere with each other due to small processing errors of the bearing and the Curvic coupling. This causes a problem in the aligning effect of the Curvic coupling, resulting not only in a reduction in accuracy of indexing of the turntable, but also in a reduction in durability of the bearing and the Curvic coupling.

Therefore, there is a system proposed in Japanese Patent Application Laid-Open No. 8-52641, which is designed, so that when a turntable is to be indexed by rotation thereof in a state in which the coupling of the Curvic coupling has been released, the turntable is moved axially and supported on a bearing, and when indexing is finished to couple the Curvic coupling, the turntable is moved in an opposite direction to produce a clearance between the turntable and the bearing, so that even if the turntable is moved radially by the aligning effect of the Curvic coupling, no load is applied to the bearing.

However, the above known system suffers from a problem that the structure for axially moving the turntable to support it on the bearing and to produce the clearance is complicated, resulting in increases in number of parts and in cost.

A pallet changer is known from Japanese Utility Model Application Laid-Open No. 63-140330, which includes a transporting-in means and a transporting-out means provided vertically in two stages and capable of supporting a pallet for the placement of a workpiece, so that the following operations are carried out automatically: an operation of transporting the pallet from the transporting-in means to a lifting/lowering frame of a pressing-in device, and an operation of transporting the pallet from the lifting/lowering frame to the transporting-out means.

This pallet changer is designed, so that a cylinder is connected to the pallet by bringing an arm piece turned by a drive source into engagement with an engage pin of the pallet, in order to move the pallet by urging or pulling it by the cylinder to conduct the delivery of the pallet between the transporting in means as well as the transporting-out means and the lifting/lowering frame of the pressing-in device.

However, the above known pallet changer suffers from a problem that to connect or disconnect the cylinder for moving the pallet, to or from the pallet, a special drive source for turning the arm piece is required, resulting in an increase in number of parts and in a complicated structure.

SUMMARY OF THE INVENTION

Accordingly, it is a first object of the present invention to ensure that holes having various sizes and shapes can be made by one type of tool, and even if a cutting blade of the tool is worn, a desired finished size is provided.

It is a second object of the present invention to ensure that a free end of a tool can be supported with good accuracy by a tail support.

It is a third object of the present invention to ensure that the locking and unlocking of a chuck at a tool delivery position for a tool changer can be carried out reliably without use of a special actuator.

It is a fourth object of the present invention to reliably prevent a load by a simple structure from being applied to a bearing for supporting a turntable on a base by an aligning effect upon coupling of a Curvic coupling.

It is a fifth object of the present invention to ensure the operation of supplying and discharging a pallet for supporting a workpiece, to and from a pallet supporting table.

To achieve the above first object, according to a first aspect and feature of the present invention, there is provided a machining centre comprising an X-axis table which is carried on a column rising from a bed and which is capable of being reciprocally moved in the direction of an X-axis, on a Y-axis table which is carried on the X-axis table, and which is capable of being reciprocally moved in the direction of a Y-axis, perpendicular to the direction of the X-axis and capable of releasably supporting, a workpiece. A Z-axis table is carried on the column and is capable of being reciprocally moved in the direction of a Z-axis perpendicular to the directions of the X-axis and the Y-axis. A spindle is supported on the Z-axis table for rotating the tool about an axis extending the direction of the Z-axis, and a tail support is mounted on a tail-support supporting member rising from the bed for supporting the free end of the tool supported on the spindle.

To achieve the above first object, according to a second aspect and feature of the present invention, there is provided a contouring process using a machining centre comprising an X-axis table which is carried on a column rising from a bed for reciprocal movement in the direction of an X-axis, a Y-axis table which is carried on the X-axis table for reciprocal movement in the direction of the Y-axis perpendicular to the direction of the X-axis and which is capable of releasably supporting a workpiece, and a Z-axis table which is carried on the column for reciprocal movement in the direction of a Z-axis perpendicular to the directions of the X-axis and the Y-axis. A spindle is supported on the Z-axis table for rotating the tool about an axis extending the direction of the Z-axis, and a tail support is mounted on a tail-support supporting member rising from the bed for supporting the free end of the tool supported on the spindle, The process comprises the step of contouring an inner periphery of a bottom hole of the workpiece by the tool, while rotating the tool supported on the spindle about the axis extending in the direction of the Z-axis, and driving the X-axis table and the Y-axis table to move the workpiece in an X-Y plane.

With the above first and second features, the workpiece is processed by rotating the tool about the axis extending in the direction of the Z-axis by the spindle mounted on the Z-axis table reciprocally moved in the direction of the Z-axis, while moving the X-axis table in the direction of the X-axis and moving the Y-axis table carried on the X-axis table n the direction of the Y-axis to move the workpiece supported on the Y-axis table in the X-Y plane. Therefore, holes having various sizes and shapes can be made by one type of a tool by controlling the movements of the X-axis and Y-axis tables to move the workpiece along any path, and moreover, the wear of a cutting blade of the tool can be compensated by correcting the path of movement of the workpiece. In this case, the flexing of the tool can be prevented to enhance the processing accuracy, because the free end of the tool is supported on the tail support mounted on the tail-support supporting member rising from the bed. Especially, with the first feature, the milling of an end face of a workpiece can be performed by used of a milling tool.

To achieve the second object, according to a third aspect and feature of the present invention, there is provided a tool supporting structure in a machine tool comprising a spindle for rotating a tool, the spindle being mounted on a column rising from a bed for advancing and retracting movements, a free end of the tool being supported by a tail support mounted on a tail-support supporting member rising from the bed, wherein the upper end of the tail-support supporting member is connected to the column.

With the third feature, the tail-support supporting member having the tail support mounted thereon for supporting the free end of the tool is straddle-supported on the bed and the column and therefore, the rigidity of the tail-support supporting member is significantly enhanced. As a result, even if a reaction force to the processing received from the workpiece by the tool, is applied to the tail-support supporting member through the tail support, the deformation of the tail-support supporting member can be prevented to support the free end of the tool with a good accuracy.

To achieve the third object, according to a fourth aspect and feature of the present invention, there is provided a tool changer designed to grasp tools by a plurality of chucks mounted at predetermined distances on a circulating endless chain, respectively, and to conduct the delivery of a tool between any of the chucks and a spindle of a machine tool. The tool changer comprises a locking means for locking a pair of openably and closably clamp arms provided in each of the chucks, in closed positions, and a cam means unlocks the locking means by abutment of a cam provided in a path of circulation of the endless chain against a cam follower provided on each of the chucks, when the chuck circulated along with the endless chain reaches a tool replacing position.

With the above fourth feature, when a tool is to be delivered between any of the chucks and the spindle of the machine tool, while grasping the tools by the plurality of chucks mounted on the endless chain to circulate the chucks in locked states, when the chuck reaches the tool replacing position, the cam provided in the path of circulation of the endless chain is put into abutment against the cam follower provided on each of the chucks, whereby the locking of the chuck is automatically released. Therefore, when the tools are to be circulated, the chucks are locked to reliably prevent the dropping of the tools, and when the tool is to be delivered, such locking can be released automatically without use of a special actuator.

To achieve the fourth object, according to a fifth aspect and feature of the present invention, there is provided a Curvic coupling device for indexing a turntable rotatably carried on a base through a bearing. The coupling device is positioned axially to a predetermined rotational angle to position the turntable in a circumferential direction. The coupling device comprises a first annular coupling member mounted on the base and having a large number of teeth formed radiantly, a second annular coupling member mounted on the turntable and having a large number of teeth formed radiantly, and a third annular member mounted on the base for movement in a direction along an axis of rotation of the turntable and having a large number of teeth formed radiantly and capable of being engaged with the teeth of the first and second coupling members, wherein the second coupling member is coupled to the turntable through a resilient member.

With the fifth feature, when the third coupling member is moved along the axis of rotation of the turntable and brought into engagement with the first and second coupling members, the second coupling member is coupled to the base through the third and first coupling members and hence, the turntable integral with the second coupling member, is positioned in the circumferential direction at a predetermined rotational angle. At this time, even if the second coupling member is moved radially relative to the base by an aligning effect of the Curvic coupling device, the radial movement of the second coupling member by the aligning effect can be absorbed by the resilient deformation of the resilient member, because the turntable is coupled to the second coupling member through the resilient member, thereby reliably preventing a radial load from being applied to the bearing supporting the turntable on the base, and ensuring an indexing accuracy of the Curvic coupling device. Moreover, the feature of the Curvic coupling device is an extremely simple structure in which the turntable and the second coupling member are merely coupled to each other through the resilient member and hence, it is possible to avoid increases in number of parts and in cost.

To achieve the fifth object, according to a sixth aspect and feature of the present invention, there is provided a pallet changer for supplying and discharging a pallet to and from a pallet supporting table which is movable in the horizontal direction of an X-axis and in the vertical direction of a Y-axis, comprising a plurality of pallet supporting sections provided in a plurality of positions spaced-apart in the direction of the Y-axis for supporting the pallet for sliding movement in the direction of the X-axis. A plurality of locking members are mounted adjacent the pallet supporting sections and reciprocally movable in the direction of the X-axis. A drive source reciprocally drives the locking members in the direction of the X-axis, and the locking members are passed in the direction of the Y-axis through a locked portion provided in the pallet and engaged with the locked portion in the direction of the X-axis.

With the sixth feature, to supply the pallet to the pallet supporting table, the empty pallet supporting table is moved in the direction of the X-axis toward the pallet changer and moved in the direction of the Y-axis so as to reach the same level as a preselected pallet supporting section. In this state, the locking member engaged with the locked portion of the pallet supported on the preselected pallet supporting section, is moved in the direction of the X-axis toward the pallet supporting table, whereby the pallet can be supplied to the pallet supporting table. When the pallet supporting table is then moved in the direction of the Y-axis, the engagement of the locking member with the locked portion is released automatically, and the pallet supporting table can be moved on the X-axis to its original position.

To discharge the pallet from the pallet supporting table, the pallet supporting table is moved in the direction of the X-axis toward the pallet changer and then moved in the direction of the Y-axis to reach the same level as the preselected pallet supporting section. When such movement of the pallet supporting table has been conducted, the locking member of the pallet supporting section is engaged automatically with the locked portion of the pallet. Therefore, the pallet can be discharged to the pallet supporting portion by moving the locking member in the direction of the X-axis by the driving source.

In this way, the engagement and disengagement of the locking member to and from the locked portion can be performed by the movement of the pallet supporting table in the direction of the X-axis and the movement of the pallet supporting table in the direction of the Y-axis. Therefore, a special actuator for conducting the engagement and disengagement is nor required, leading to a simplified structure.

The above and other objects, features and advantages of the invention will become apparent from the following description of the preferred embodiment taken in conjunction with the accompanying drawings.

BRIEF DESCRIPTION OF THE DRAWINGS

FIGS. 1 to 18 show a first embodiment of the present invention, wherein

FIG. 1 is a plan view of the entire arrangement of a machining centre.

FIG. 2 is a view taken in the direction of an arrow 2 in FIG. 1.

FIG. 3 is a view taken along the line 3—3 in FIG. 1.

FIG. 4 is a view taken in the direction of the arrow 4 in FIG. 1.

FIG. 5 is a perspective view of the machining centre.

FIG. 6 is a view showing a loader for transporting a workpiece.

FIG. 7 is a sectional view taken along the line 7—7 in FIG. 2.

FIG. 8 is an enlarged view taken in the direction of the arrow 8 in FIG. 1.

FIG. 9 is a view taken in the direction of the arrow 9 in FIG. 8.

FIG. 10 is a view taken in the direction of the arrow 10 in FIG. 8.

FIG. 11 is an enlarged sectional view of a section indicated by 11 in FIG.

FIG. 12 is a view taken in the direction of the ;arrow 12 in FIG. 11.

FIG. 13 is a sectional view taken along the line 13—13 in FIG. 12.

FIG. 14 is an enlarged sectional view of a section indicated by 14 in FIG. 10.

FIG. 15 is a view taken in the direction of the arrow 15 in FIG. 14.

FIG. 16 is a view for explaining the operation of a chuck.

FIG. 17 is a view for explaining the operation during contouring.

FIG. 18 is a sectional view taken along the line 18—18 in FIG. 17.

FIGS. 19 to 23 show a second embodiment of the present invention, wherein

FIG. 19 is an enlarged sectional view taken along the line 19—19 in FIG. 1.

FIG. 20 is an enlarged view of an essential portion shown in FIG. 19.

FIG. 21 is a view taken along the line 21—21 in FIG. 20.

FIG. 22 is a view taken along the line 22—22 in FIG. 20.

FIG. 23 is a view for explaining the operation of a Curvic coupling.

FIGS. 24 to 28 show a third embodiment of the present invention, wherein

FIG. 24 is a view of the entire arrangement of a pallet changer.

FIG. 25 is a view taken in the direction of the arrow 25 in FIG. 24.

FIG. 26 is a view taken in the direction of the arrow 26 in FIG. 24.

FIG. 27 is a view for explaining the operation when the pallet is changed.

FIG. 28 is a view taken in the direction of the arrow 28 in FIG. 27.

DESCRIPTION OF THE PREFERRED EMBODIMENTS

Figure 1:
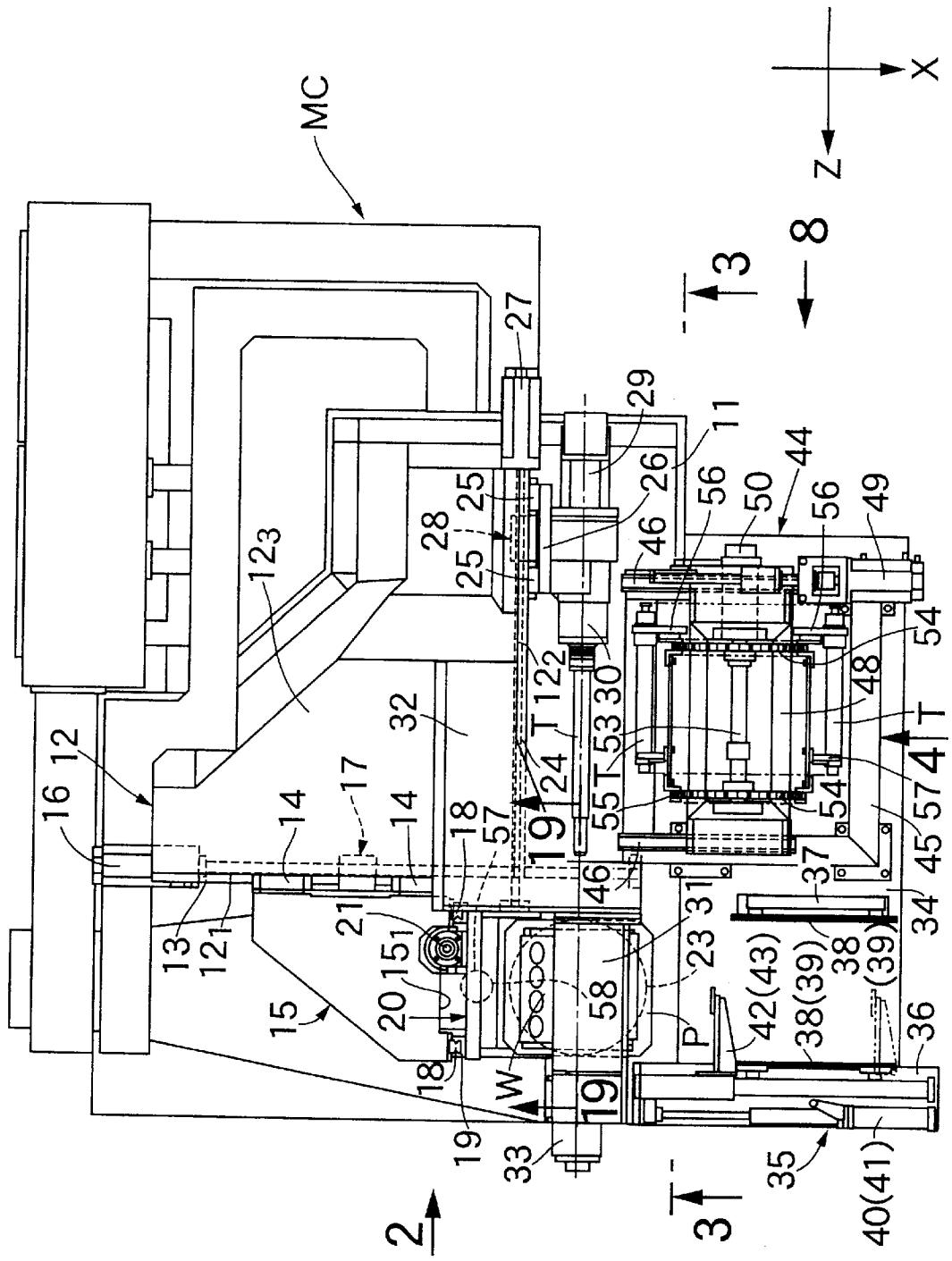
Figure 2:
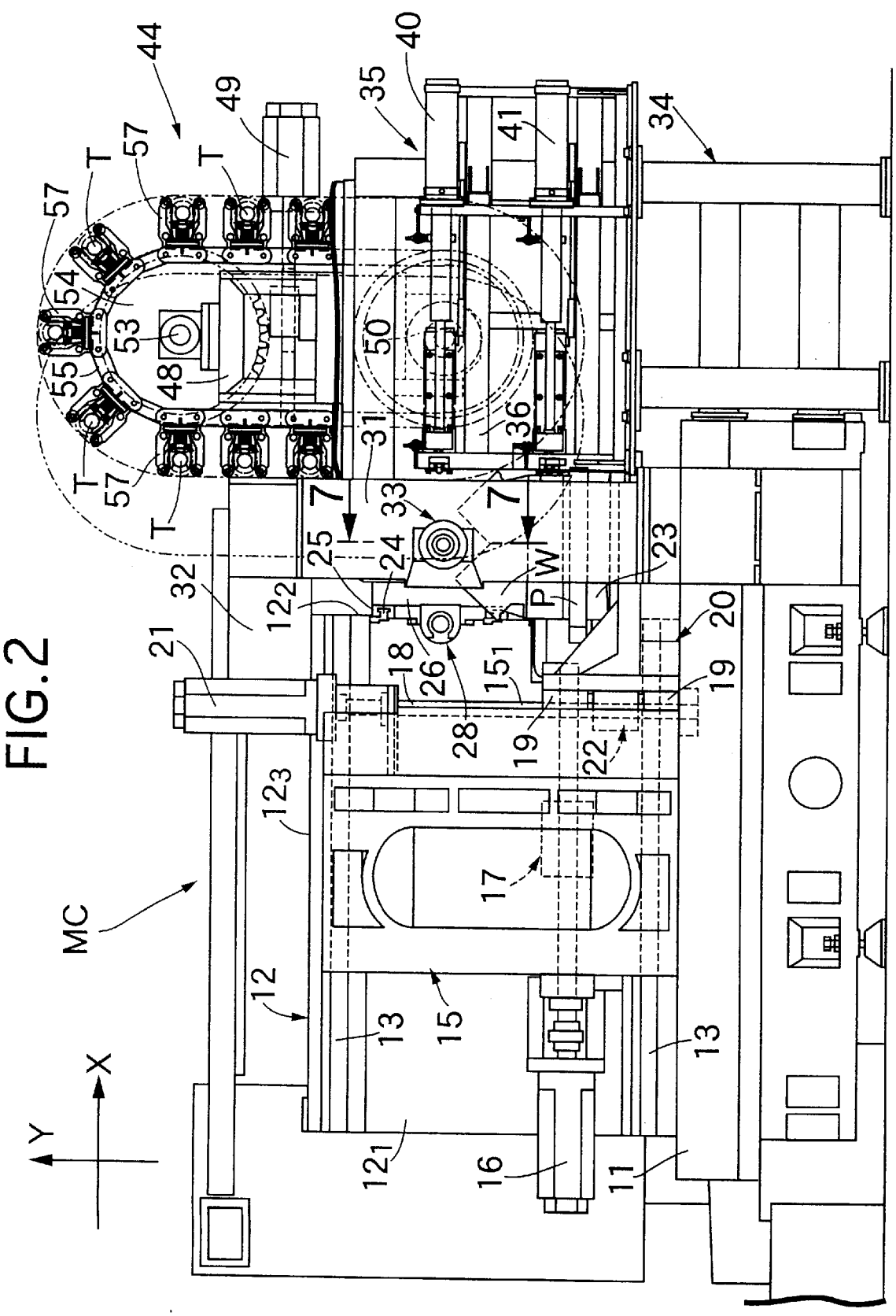
Figure 3:
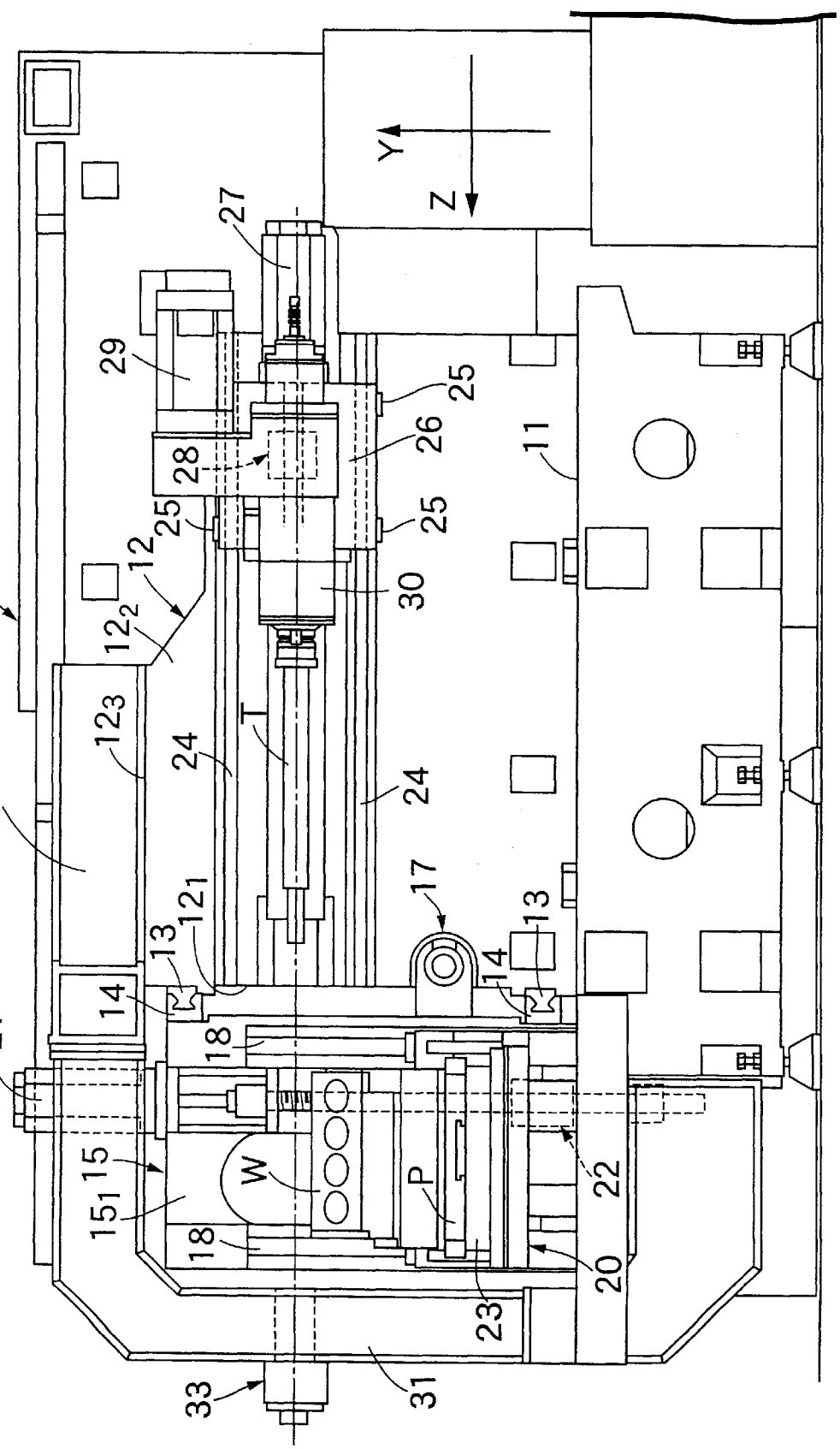
Figure 4:
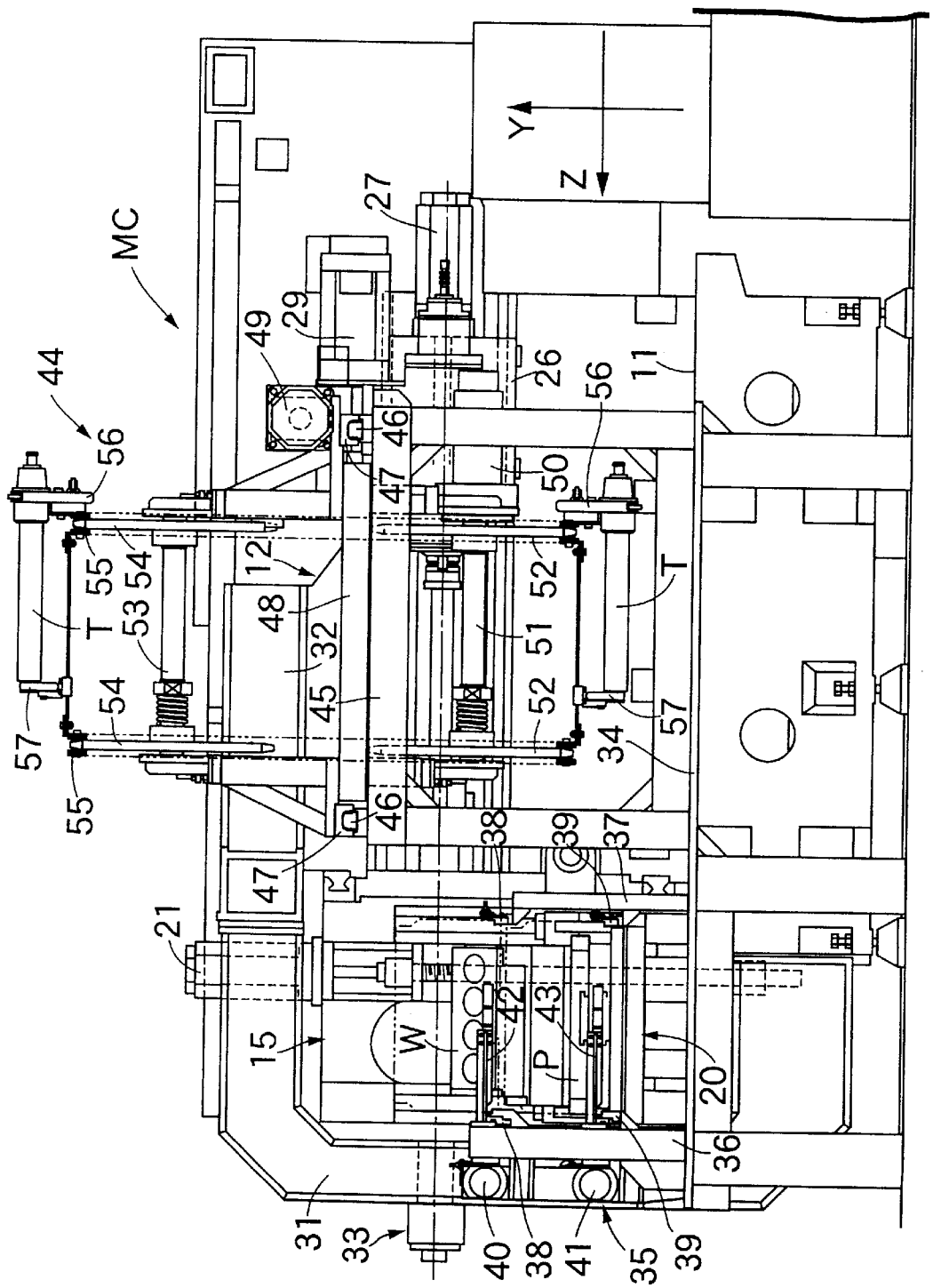
Figure 5:
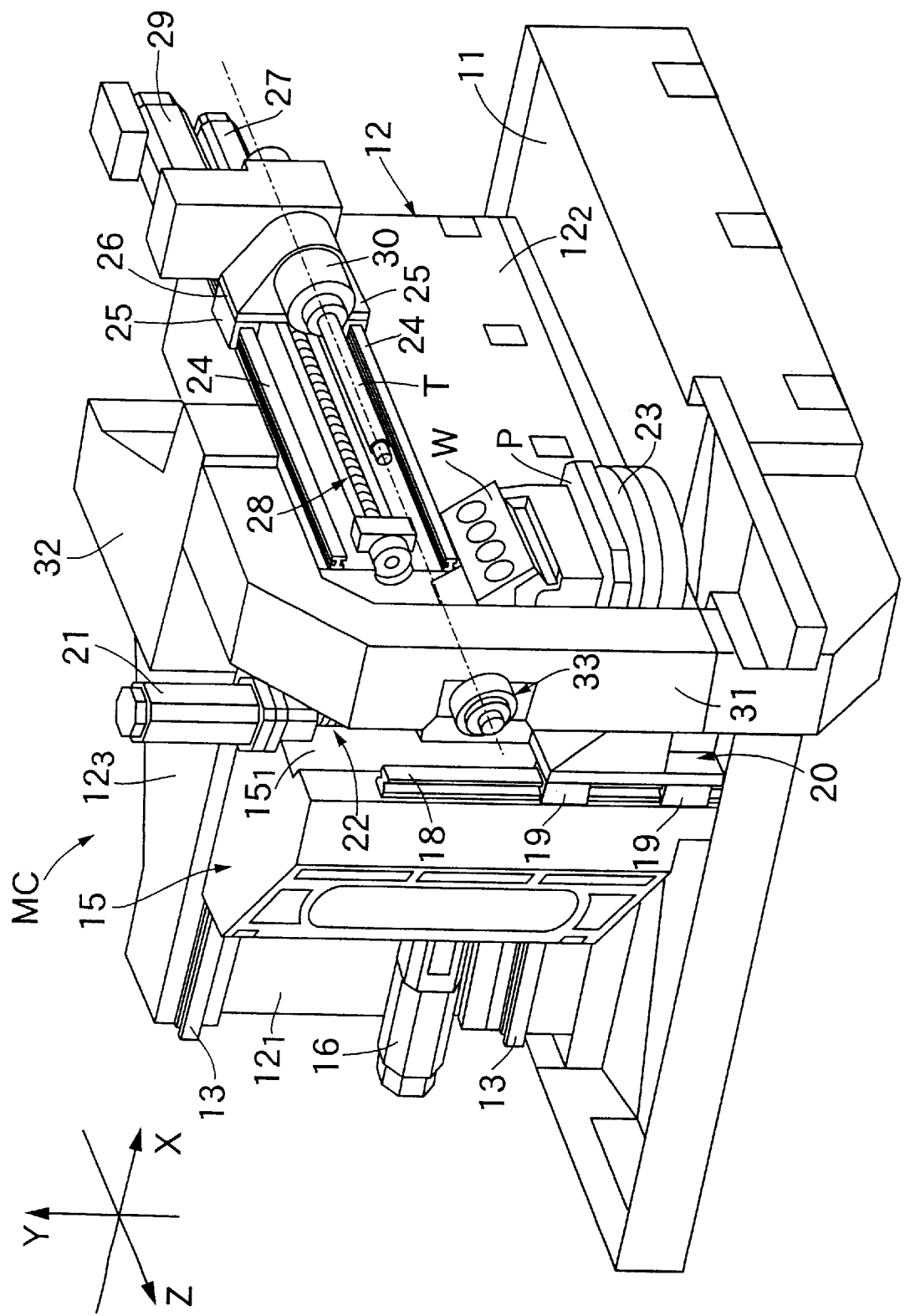

A first embodiment of the present invention will now be described with reference to FIGS. 1 to 18.

As shown in FIGS. 1 to 5, a machining centre MC according to this embodiment includes a bed 11 placed on a floor surface, and a column 12 rises on a flat upper surface of the bed 11. Two guide rails 13, 13 are fixed in the direction of an X-axis to a flat front wall surface $12_1$ facing in the direction of a Z-axis, and an X-axis table 15 is slidable carried on the two guide rails 13, 13 with slide guides 14 interposed therebetween. An X-axis servo motor 16 is mounted on the front wall surface $12_1$ of the column 12, and the X-axis table 15 connected to the X-axis servo motor 16 through a ball screw mechanism 17, is reciprocally driven in the direction of the X-axis by the X-axis servo motor 16, while being guided on the guide rails 13, 13.

Two guide rails 18, 18 are fixed in a direction of a Y-axis to that sidewall surface $15_1$ of the X-axis table 15 which faces in the direction of the X-axis, and a Y-axis table 20 is slidably carried on the two guide rails 18, 18 with slide guides 19 interposed therebetween. A Y-axis servo motor 21 is mounted on the sidewall surface $15_1$ of the X-axis table 15, and the Y-axis table 20 connected to the servo motor 21 through a ball screw mechanism 22, is reciprocally driven in the direction of the Y-axis by the Y-axis servo motor 21, while being guided on the guide rails 18, 18.

A turntable 23 is mounted on an upper surface of the Y-axis table 20, and is rotatable about an axis extending in the direction of the Y-axis by a turntable driving motor 58. A pallet P for supporting a cylinder block W of an engine for an automobile which forms a workpiece in this embodiment, is detachably fixed onto the turntable 23.

Two guide rails 24, 24 are fixed in the direction of the Z-axis to that sidewall surface $12_2$ of the column 12 which faces in the direction of the X-axis, and a Z-axis table 26 is slidably carried on the two guide rails 24, 24 with slide guides 25 interposed therebetween. A Z-axis servo motor 27 is mounted on the sidewall surface $12_2$ of the column 12, and the Z-axis table 26 connected to the Z-axis servo motor 27 through a ball screw mechanism 28, is reciprocally driven in the direction of the Z-axis by the Z-axis servo motor 27, while being guided on the guide rails 24, 24. A spindle 30 is mounted on the Z-axis table 26 and rotated by a spindle driving motor 29.

A tail-support supporting member 31 formed in an L-shape, is disposed to cover front and upper portions of the Y-axis table 20, and rises from the upper surface of the bed 11, with its upper end connected to an upper wall surface $12_3$ of the column 12 through a connecting member 32. A tool T chucked to the spindle 30 and extending in the direction of the Z-axis is supported at its front end in a tail support 33 mounted on a vertical portion of the tail-support supporting member 31.

A pallet changer 35 for transporting the pallet P to and from the turntable 23 on the Y-axis table 20 is mounted on an upper surface of a support base 34 mounted on one side of the bed 11. The pallet changer 35 is constructed in two vertical stages, with a pair of upper guide rails 38, 38 and a pair of lower guide rails 39, 39 for supporting the pallet P mounted on a first rail support 36 and a second rail support 37, respectively. An upper cylinder 40 and a lower cylinder 41 are mounted on the first rail support 36, and an upper locking member 42 and a lower locking member 43, which are engageable with the pallet P, are reciprocally driven in the direction of the X-axis by the upper cylinder 40 and the lower cylinder 41, respectively.

Figure 6:
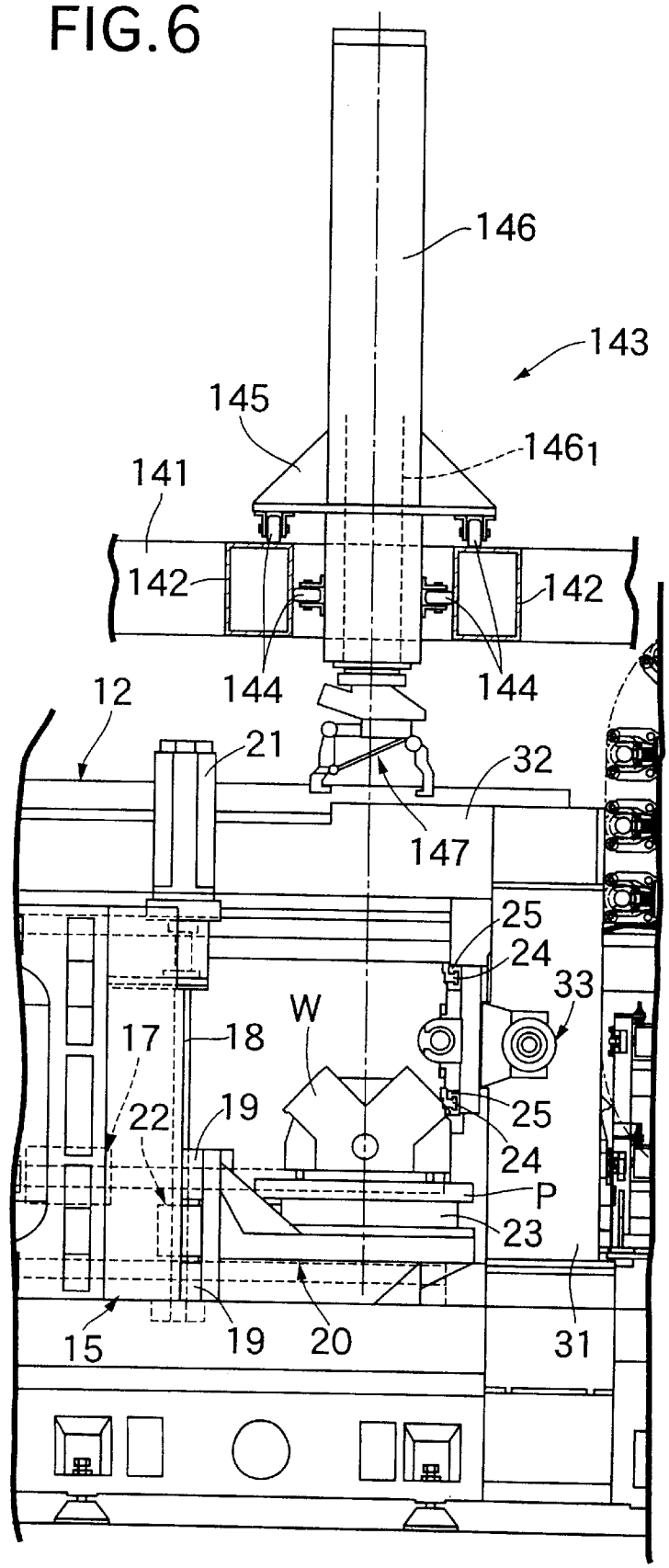

As shown in FIG. 6, guide rails 142, 142 are spanned on a beam 141 mounted above the machining centre MC, and a loader 143 is carried on the guide rails 142, 142. The loader 143 includes a carriage 145 which is movably carried on the guide rails 142, 142 by a plurality of rollers 144 interposed therebetween, a cylinder 146 vertically mounted on the carriage 145, and a chuck 147 mounted at a lower end of an output rod $146_1$ in the cylinder 146, to be able to grasp the cylinder block W.

When the turntable 23 mounted on the Y-axis table 20, is in a lower position on the guide rails 142, 142, the loader 143 having the cylinder block W grasped by the chuck 147 can be moved to above the pallet P carried on the turntable 23, and the chuck 147 is lowered by the cylinder 146, whereby the cylinder block W can be supplied onto the pallet P. On the other hand, the cylinder block W on the pallet P can be grasped by the chuck 147 and lifted by the cylinder 146, and the carriage 145 can be allowed to travel along the guide rails 142, 142, whereby the cylinder block W can be discharged.

Figure 7:
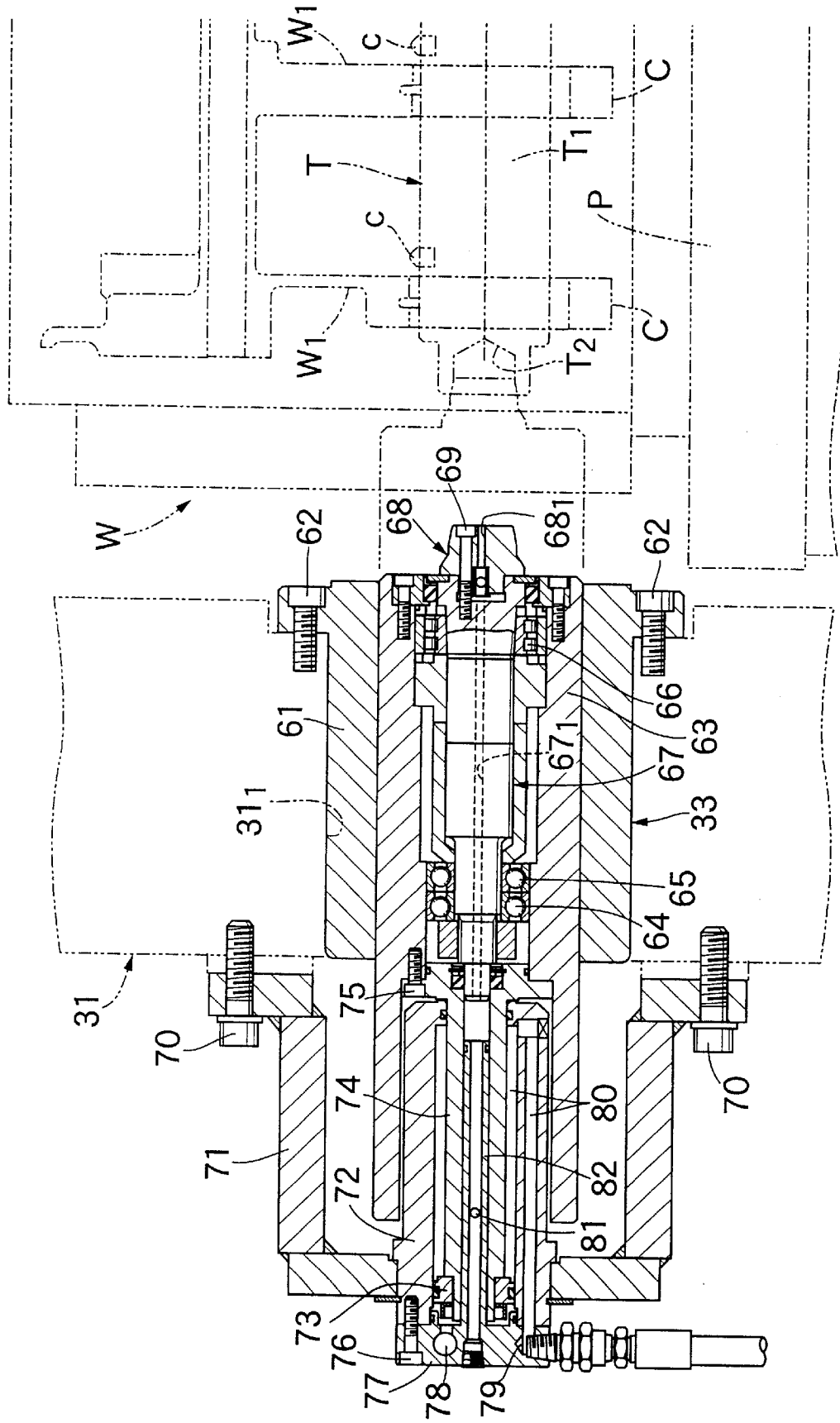
Figure 8:
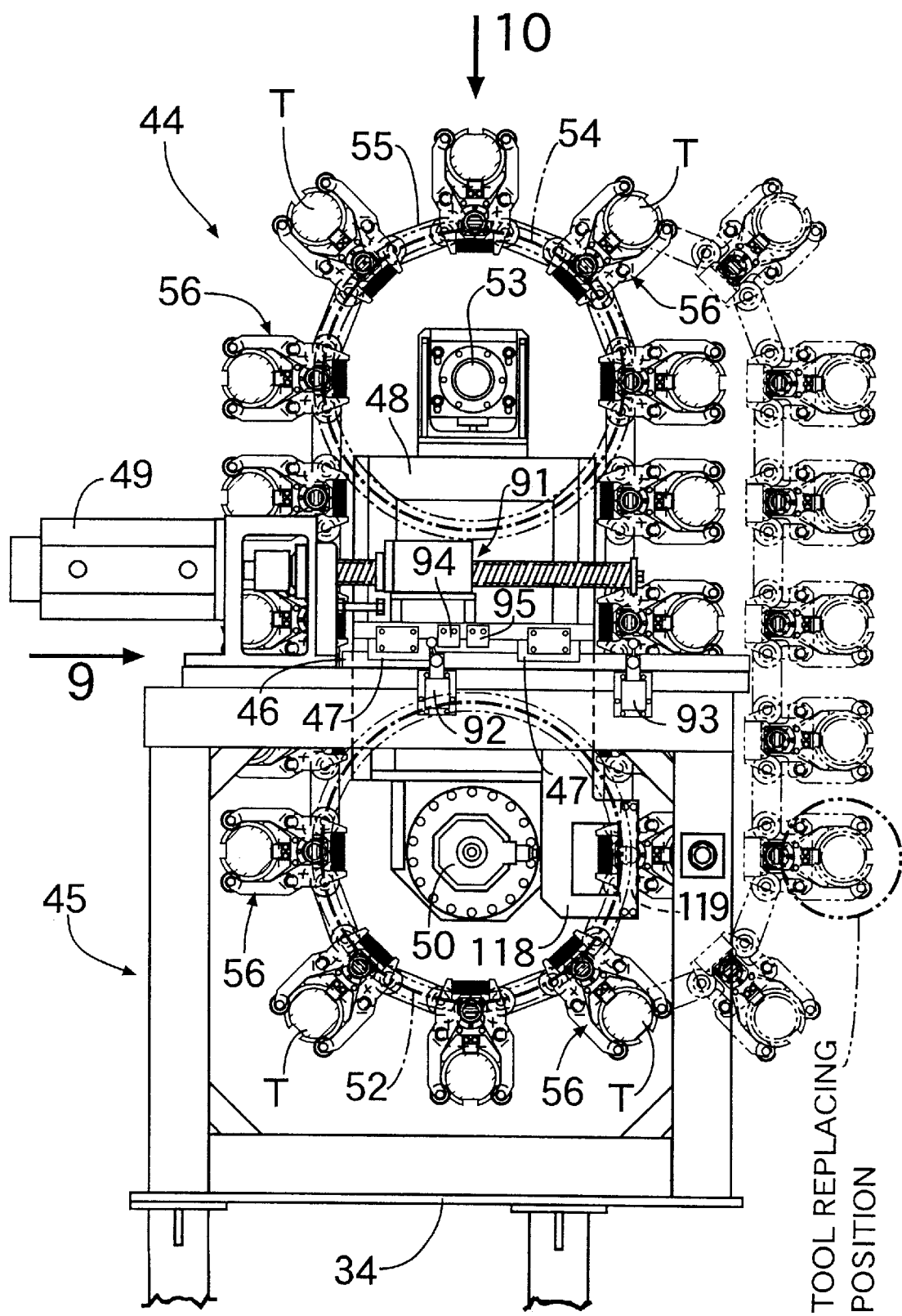
Figure 9:
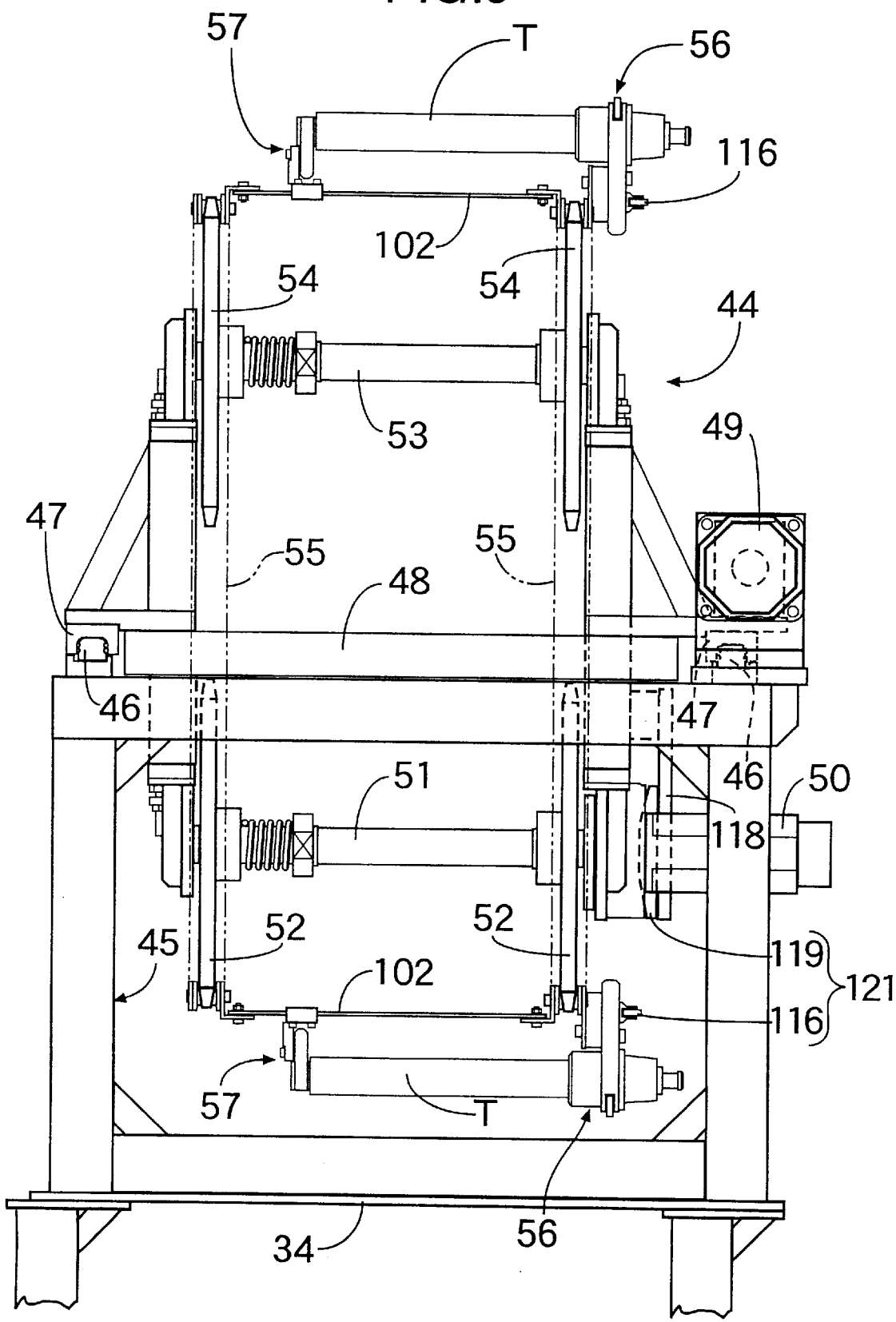
Figure 10:
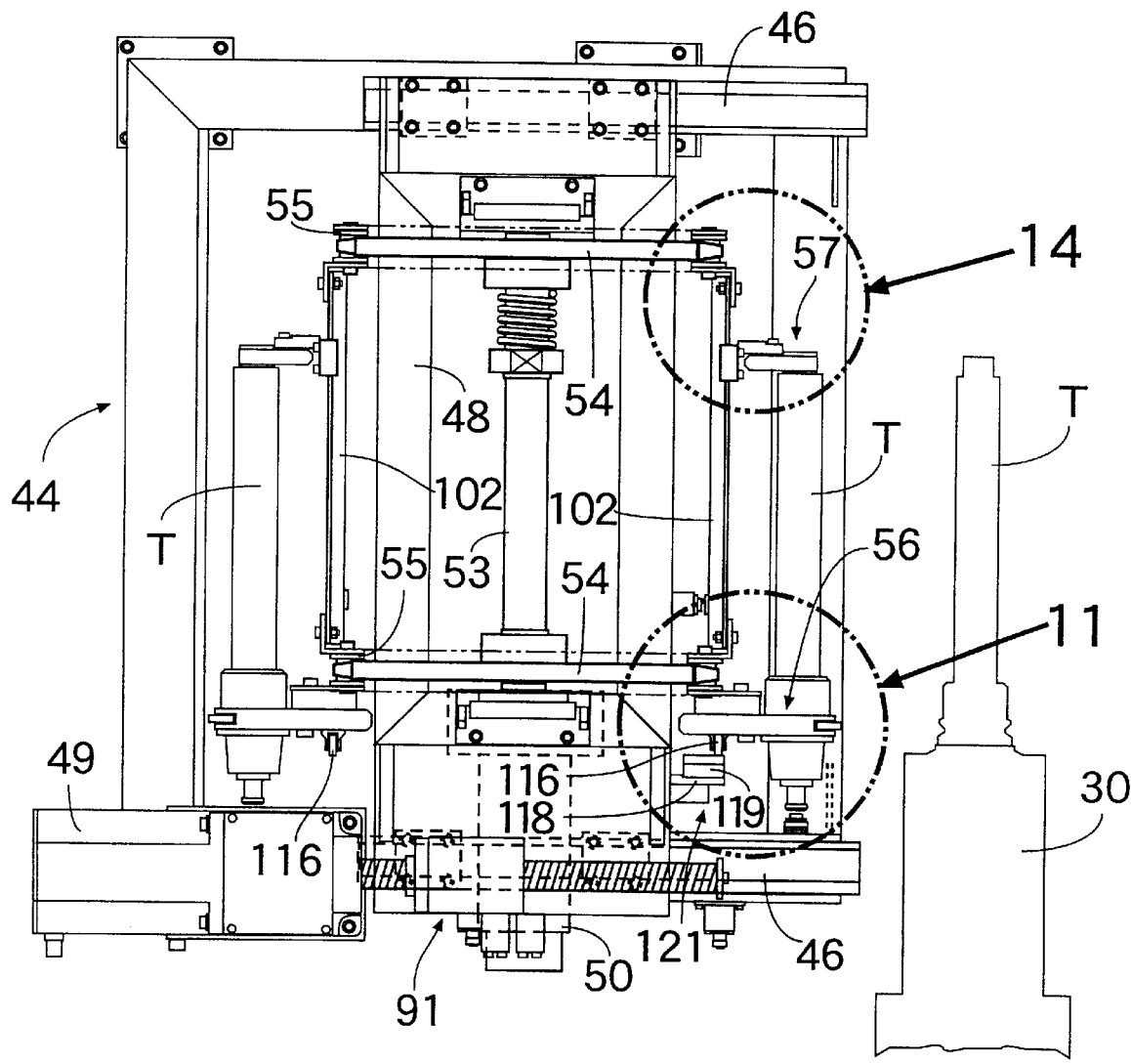
Figure 11:
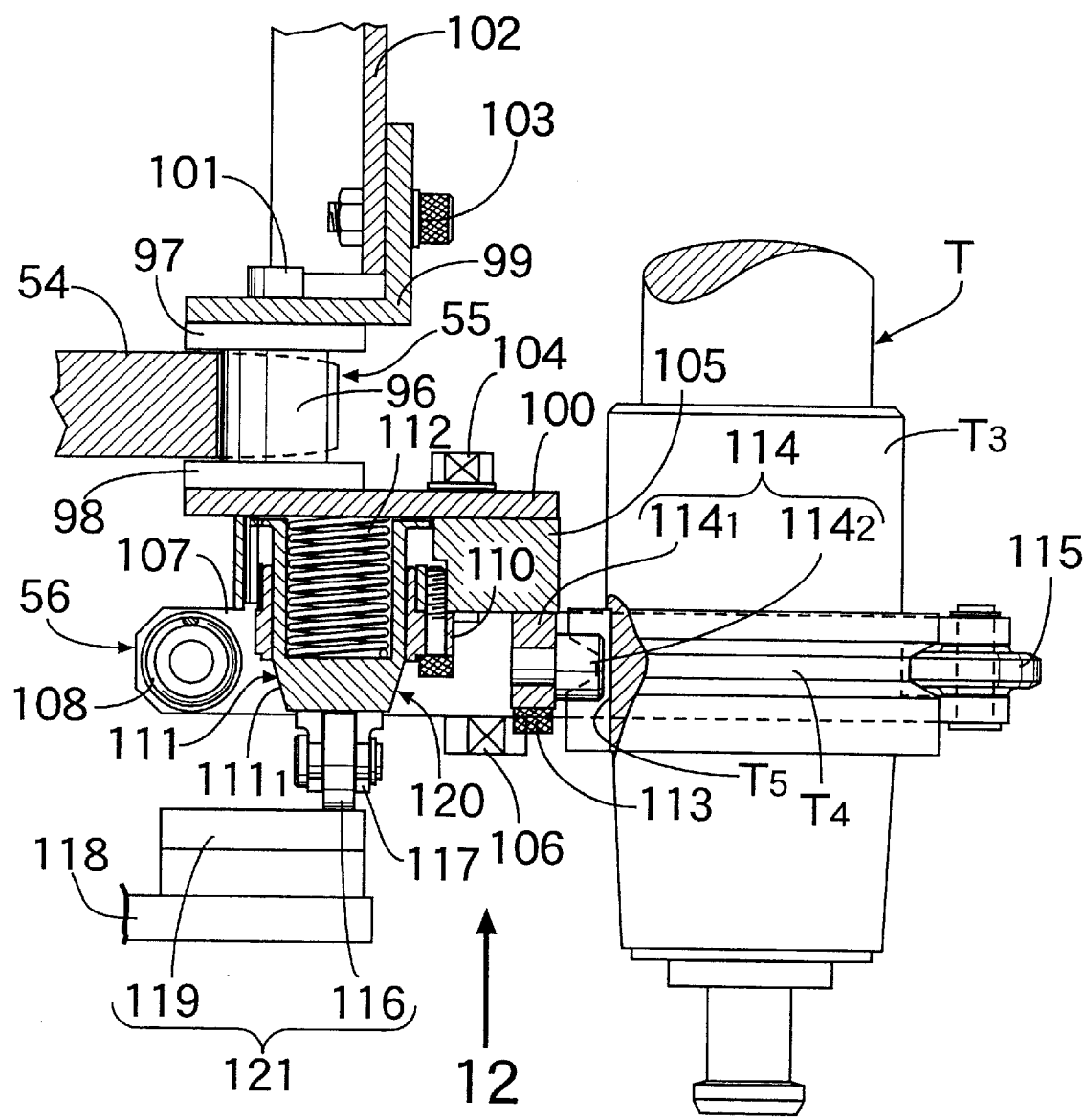
Figure 12:
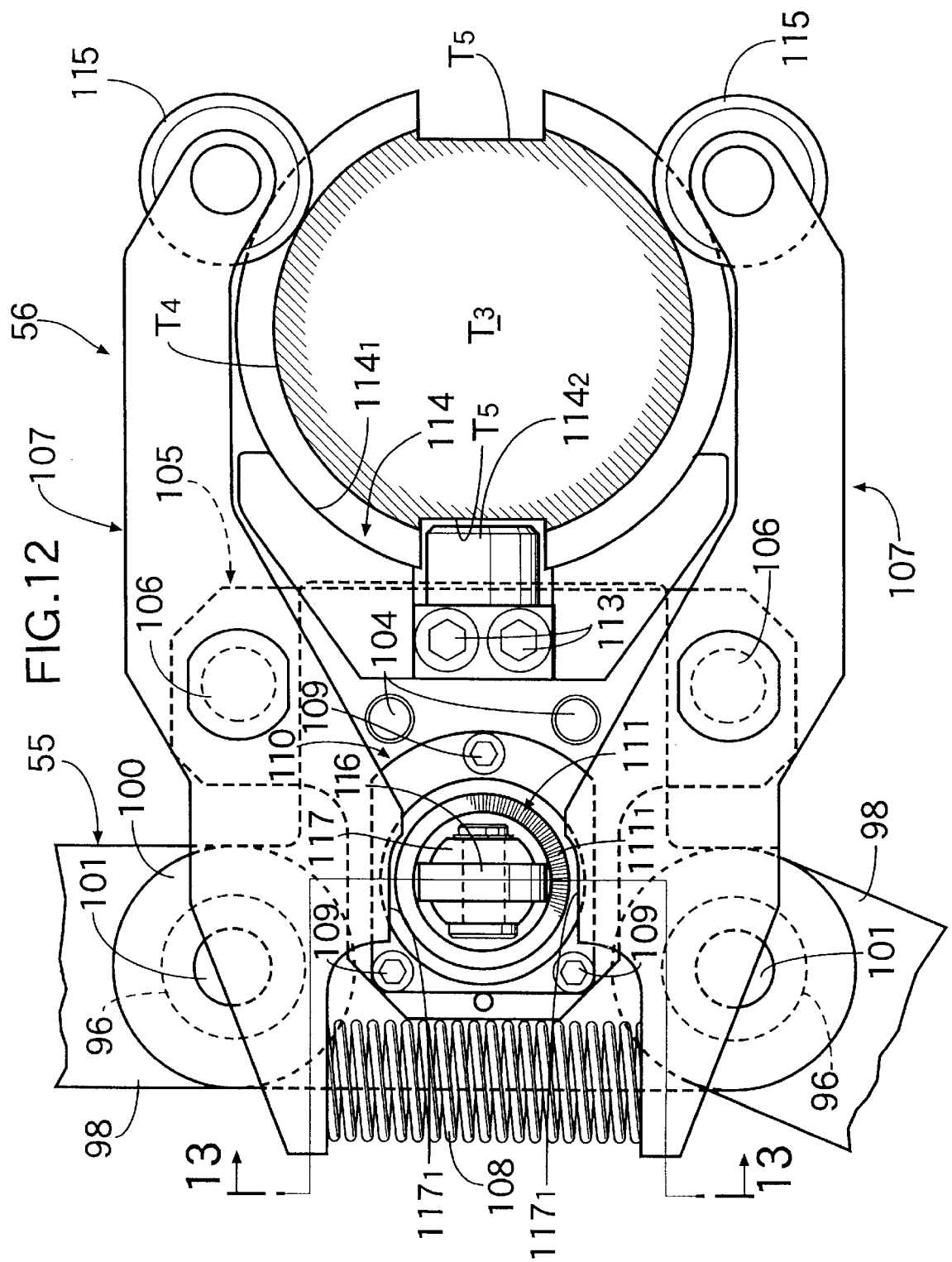
Figure 13:
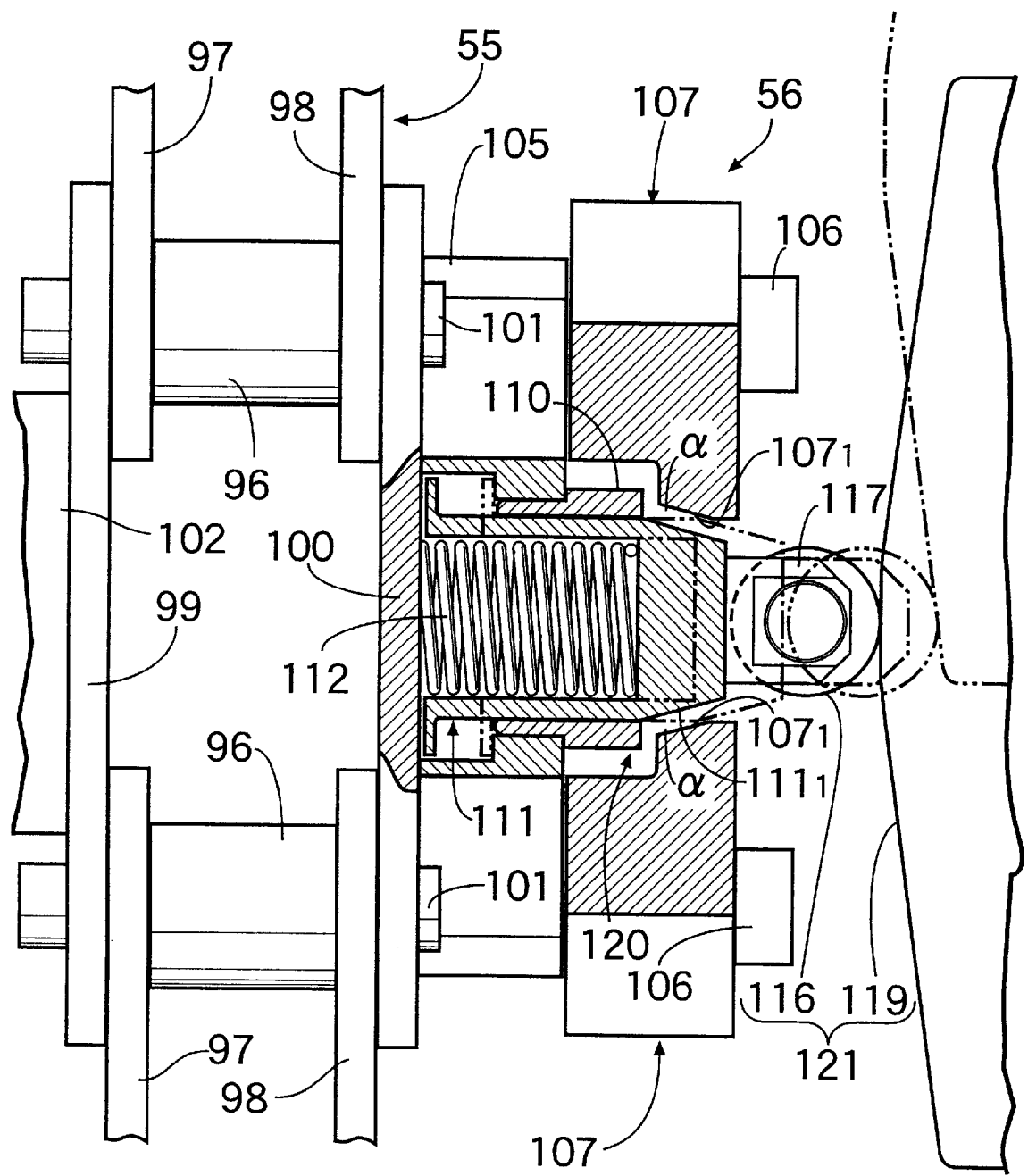
Figure 14:
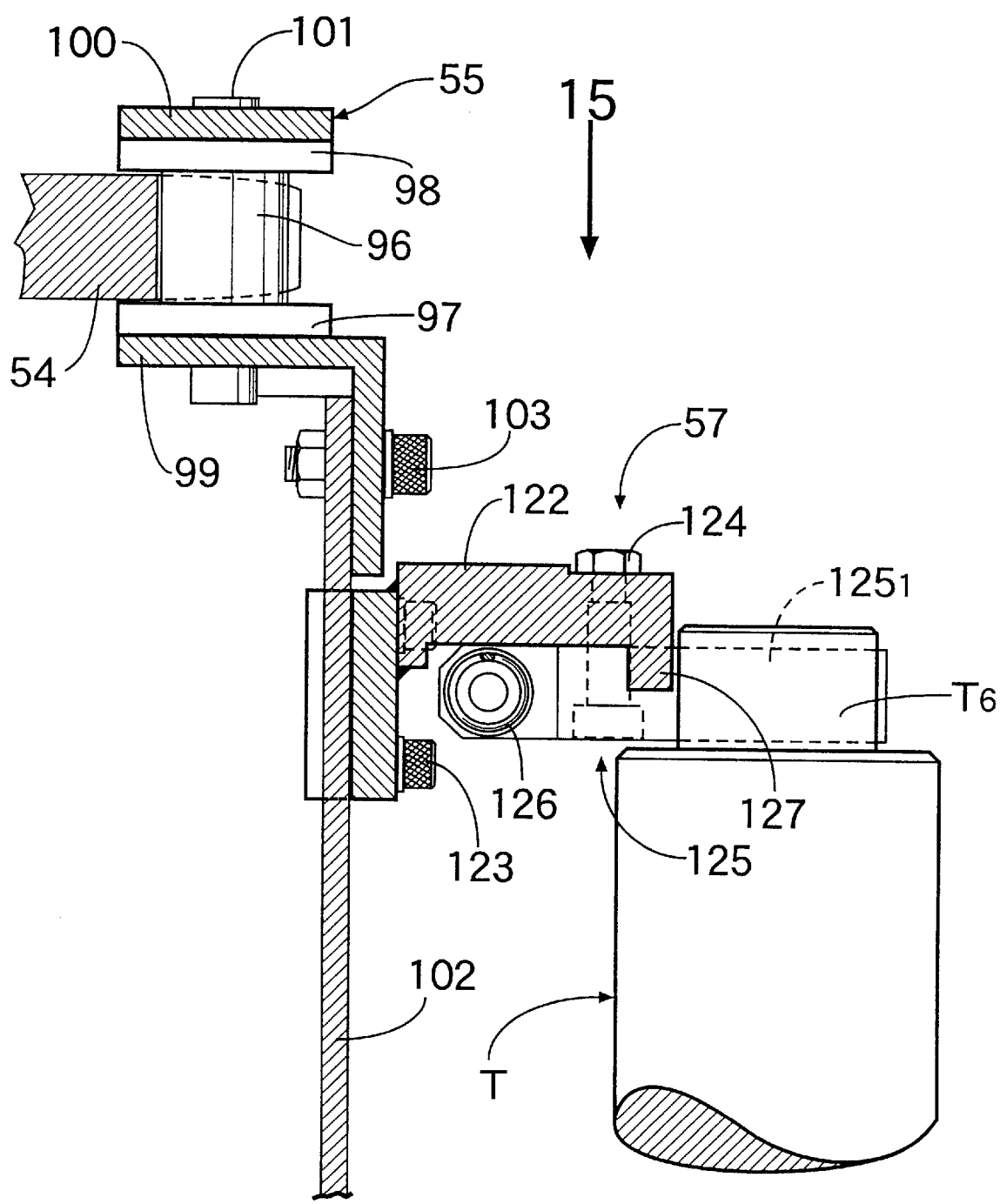
Figure 15:
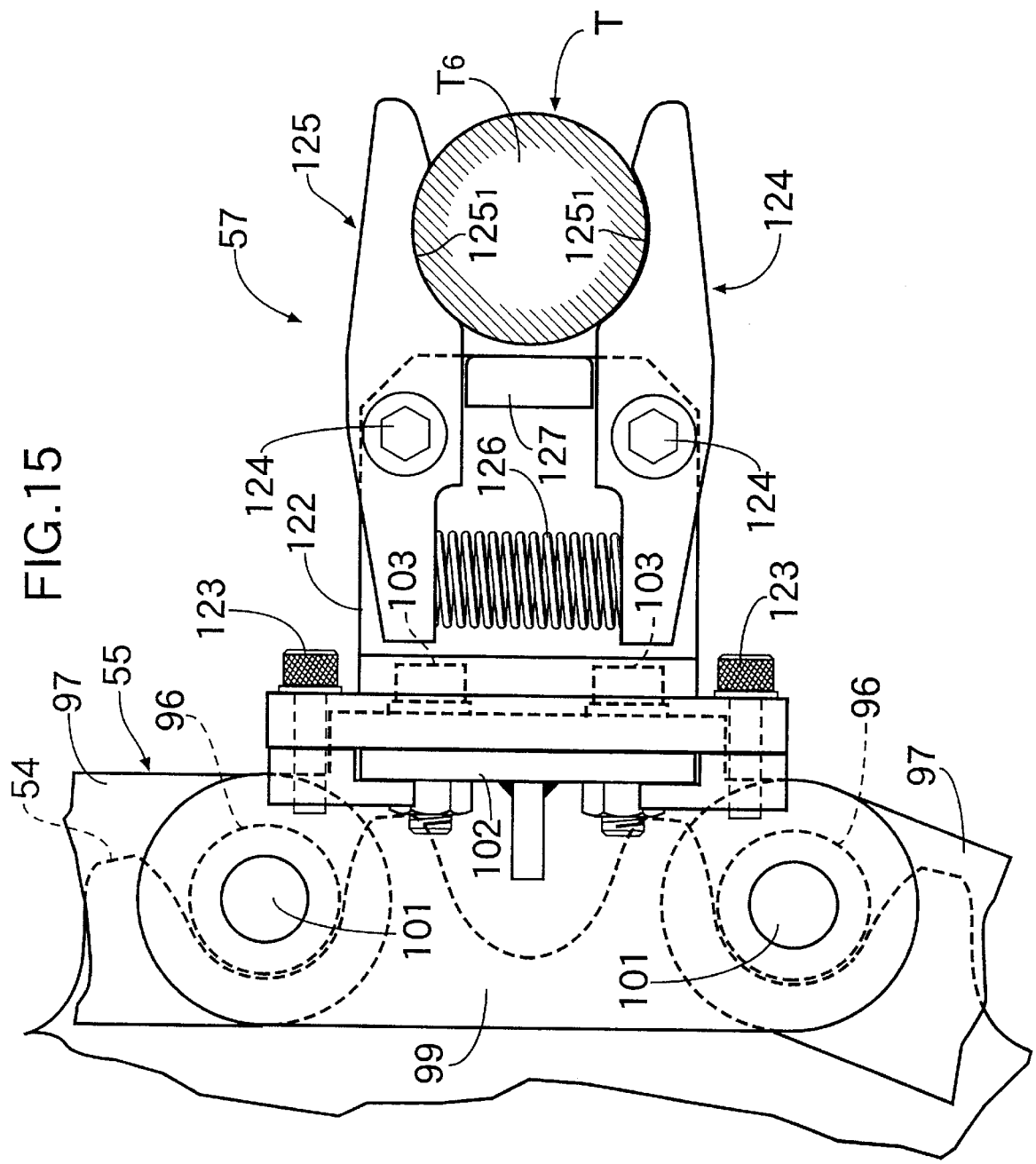
Figure 16:
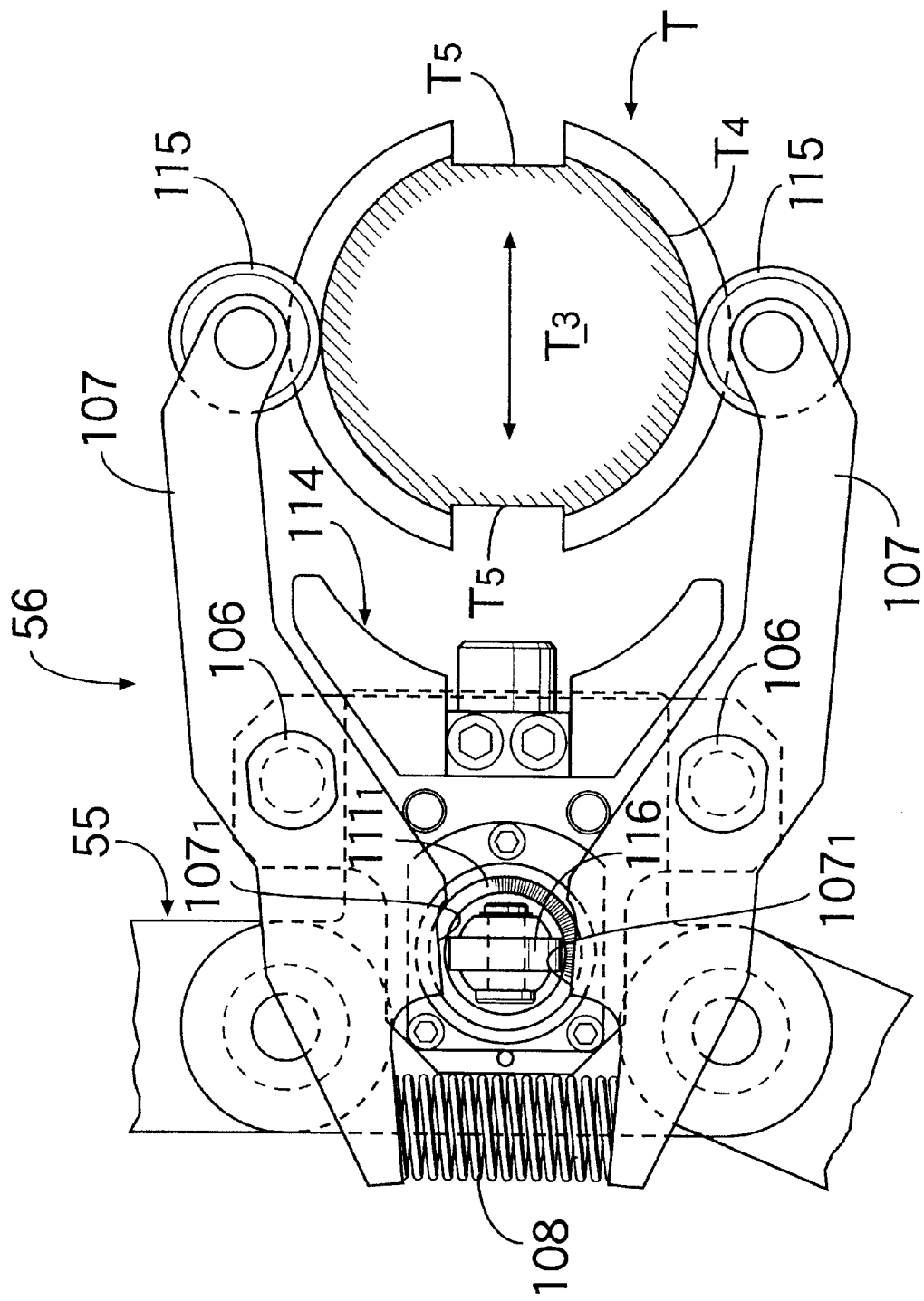

The structure of the tail support 33 will be described below with reference to FIG. 7.

A ball spline 61 is fixed by bolts 62 in a support bore $31_1$ extending through the tail-support supporting member 31, and a slide rod 63 is relatively non-rotatably and axially slidably carried within the ball spline 61. A rotary shaft 67 is relatively non-rotatably and axially non-movably supported within the slide rod 63 with ball bearings 64 and 65 and a roller bearing 66 interposed therebetween. A center member 68 is fixed to a rear end of the slide rod 63 by a bolt 69 and is engageable into a recess $T_2$ defined in a front end of the tool T.

A cylinder 72 is supported on a bracket 71 fixed to a front surface of the tail-support supporting member 31 by a bolt 70, and an inner periphery of a front portion of the slide rod 63 is fitted over an outer periphery of a rear portion of the cylinder 72. A piston rod 74 having a piston 73 integrally fixed thereto and slidably received on the cylinder 72, is coupled at a rear end thereof to an intermediate portion of the slide rod 63 by bolts 75.

A first port 78 and a second port 79 are provided in a cylinder head 77 fixed by bolts 76 to close a front end of the cylinder 72. The first port 78 communicates with a front surface of the piston 73, and the second port 79 communicates with a rear surface of the piston 73 through an oil passage 80. An air pipe 82 having a port 81 in the piston rod 74 extends from the front end of the cylinder 72, and has, at its rear end, an opening which communicates with a rear end face of the center member 68 through air passages $67_1$ and $68_1$ extending axially through the centers of the rotary shaft 67 and the center member 68.

The structure of a tool changer 44 will be described below with reference to FIGS. 8 to 15.

A tool changer 44 is mounted on an upper surface of the support base 34, and designed, so that a plurality of types of tools T are stocked and a selected tool T is delivered to the spindle 30. A pair of guide rails 46, 46 extending in the direction of the X-axis are fixed to a support frame 45 mounted on the upper surface of the support base 34, so that a slide frame 48 carried on the guide rails 46, 46 with slide guides 47 interposed therebetween, is reciprocally driven in the direction of the X-axis by a servo motor 49 and a ball screw mechanism 91. The tool changer 44 is usually in a position shown by the solid line in FIG. 8, and is moved to a position shown by the dashed line, when the tool T is to be delivered to or received from the spindle 30. In this case, an end of movement of the tool changer 44 is detected by two limit switches 92, 92 and two dogs 95, 95 actuating the limit switches 92, 92. A position for replacement of the tool T is indicated in the encircled dashed line in FIG. 8.

A pair of endless chains 55, 55 are received around the following sprockets: a pair of driving sprockets 52, 52 mounted at opposite ends of a driving shaft 51 supported below the slide frame 48 and rotated by a tool changer driving motor 50, and a pair of follower sprockets 54, 54 mounted at opposite ends of a follower shaft 53 supported above the slide frame 48. A plurality of chucks 56 and a plurality of chucks 57 are mounted on the endless chains 55, 55, respectively, so that front and rear opposite ends of the plurality of tools T are grasped by the chucks 56 and 57.

The endless chain 55 is constructed by bringing ends of a pair of inner chain links 97 and 98 into abutment against axially opposite ends of a chain roller 96 meshed with the driving sprocket 52 or the follower sprocket 54, placing ends of a pair of outer chain links 99 and 100 on outer sides of such ends of the inner chain links to pivotally fasten both the ends by a pin 101, and connecting the resulting assemblies in a lengthwise endless shape. The opposed outer chain links 99, 99 of the pair of endless chains 55, 55 are connected to each other by a connecting member 102 and bolts 103, 103, and the chucks 56, 56 are mounted on the outer chain links 100, 100 located on the side opposite to the connecting member 102.

Each of the chucks 56 includes a support block 105 fixed to the outer chain link 100 by bolts 104, 104, a pair of clamp arms 107, 107 pivotally supported on the support block 105 through support shafts 106, 106, a spring 108 for biasing the clamp arms 107, 107 in the closing direction, a lock pin housing 110 fixed to the support block 105 by bolts 109, a lock pin 111 slidably carried in the lock pin housing 110, a spring 112 for biasing the lock pin 111 in such a direction to protrude from the lock pin housing 110, and a positioning member 114 supported on the support block 105 by bolts 113, 113.

The clamp arms 107, 107 pivotally supported at their intermediate portions by the support shafts 106, 106, are biased, by the spring 108 mounted under compression at their base ends, in the closing directions such that rollers 115, 115 mounted at their tip ends approach each other. The rollers 115, 115 can be engaged into an annular grooves $T_4$ defined in a grasped portion $T_3$ of the tool T by the action of the spring 108, thereby grasping the tool T without looseness. Locked faces $107_1$, $107_1$ provided at the base ends of the clamp arms 107, 107 are opposed to a tapered locking face $111_1$ provided at a tip end of the lock pin 111 which protrudes from the lock pin housing 110 under the action of a resilient force of the spring 112. A cam follower 116 comprising a roller is carried at the tip end of the lock pin 111 with a bracket 117 interposed therebetween. The positioning member 114 is comprised of an arcuate abutment portion $114_1$ capable of abutting against the grasped portion $T_3$ of the tool T, and a positioning pin $114_2$ capable of being fitted into one of pin bores $T_5$, $T_5$ provided at locations in the annular groove $T_4$. The positioning member 114 is capable of being put into abutment against inner surfaces of opposed tip ends of the clamp arms 107, 107, and also functions as a stopper for defining the closed portions of the opposed tip ends.

A cam 119 is fixed to a lower end of a cam supporting member 118 depending from the side face of the slide frame 48, and extends in a direction of traveling movement of the endless chain 55. The cam 118 is mounted at a location for delivery of the tool T to the spindle 30 and is capable of being put into abutment against the cam follower 116 of the chuck 56 passing through the location.

The lock pin 111, the spring 112 and the locked faces $107_1$, $107_1$ of the clamp arms 107, 107 constitute a locking means 120 of the present invention, and the cam follower 116 and the cam 118 constitute a cam means 121 of the present invention.

A support block 122 is fixed by bolts 123, 123 to the connecting member 102, which interconnects the opposed outer chain links 99, 99 of the pair of endless chains 55, 55. A pair of clamp arms 125, 125 are pivotally supported at their intermediate portions on the support block 122 through support shafts 124, 124. Tip ends of the clamp arms 125, 125 are biased in a direction to approach each other by a spring 126 mounted under compression between base ends of the clamp arms 125, 125, so that a small-diameter portion $T_6$ at the tip end of the tool T can be grasped between arcuate faces $125_1$, $125_1$ formed at the tip ends of the clamp arms 125, 125 without being loosened. A stopper 127 is mounted on a side face of the support block 122 for defining closed positions of the clamp arms 125, 125.

Figure 17:
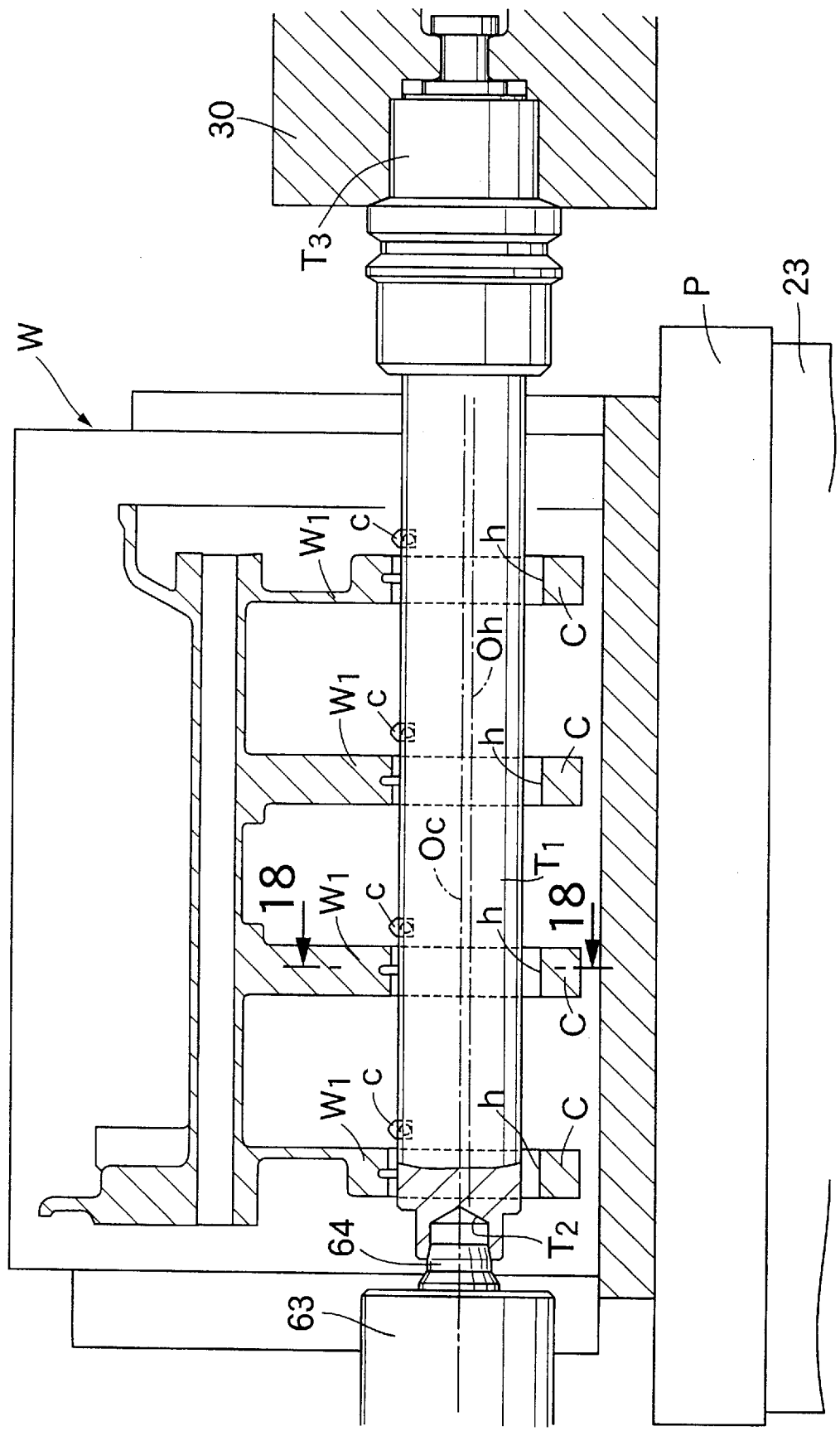
Figure 18:
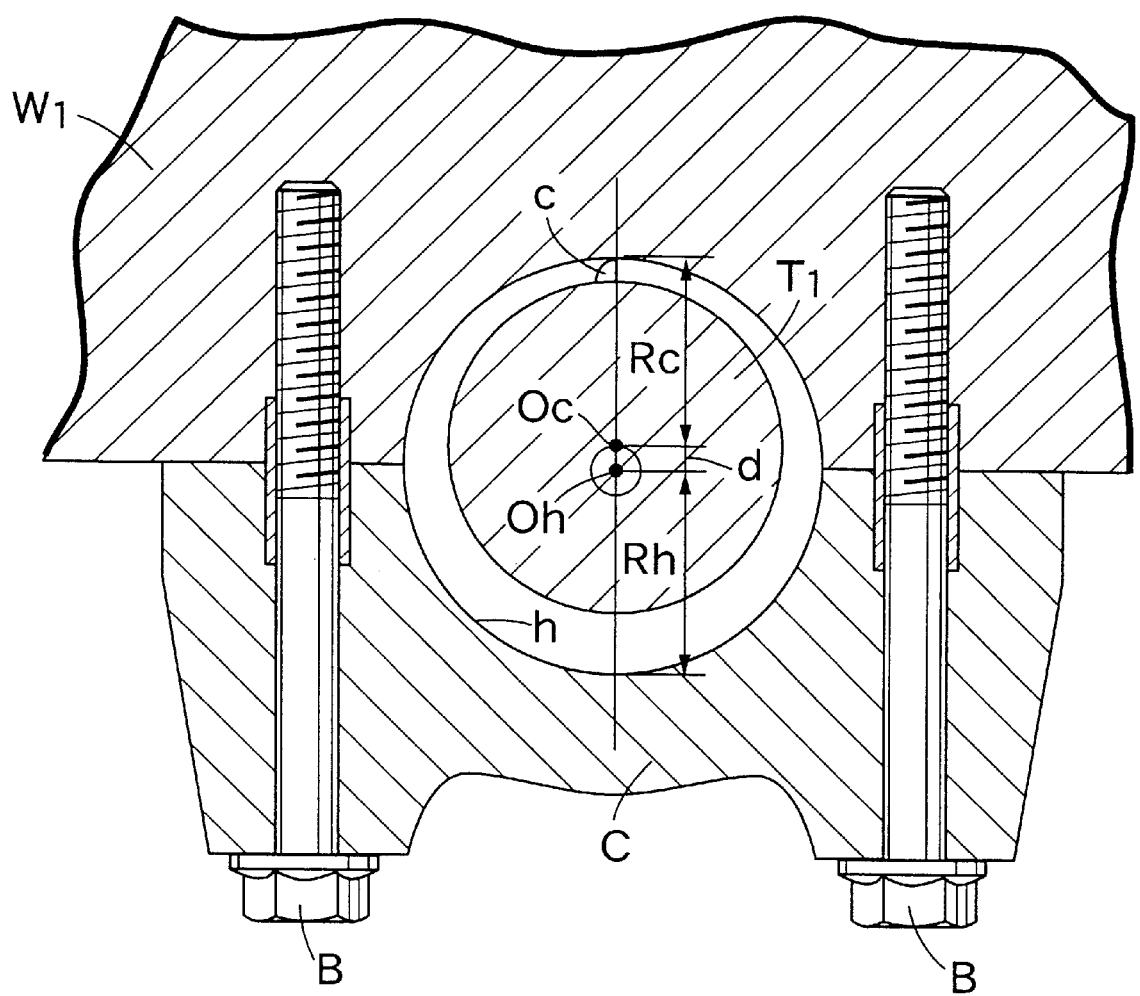
Figure 19:
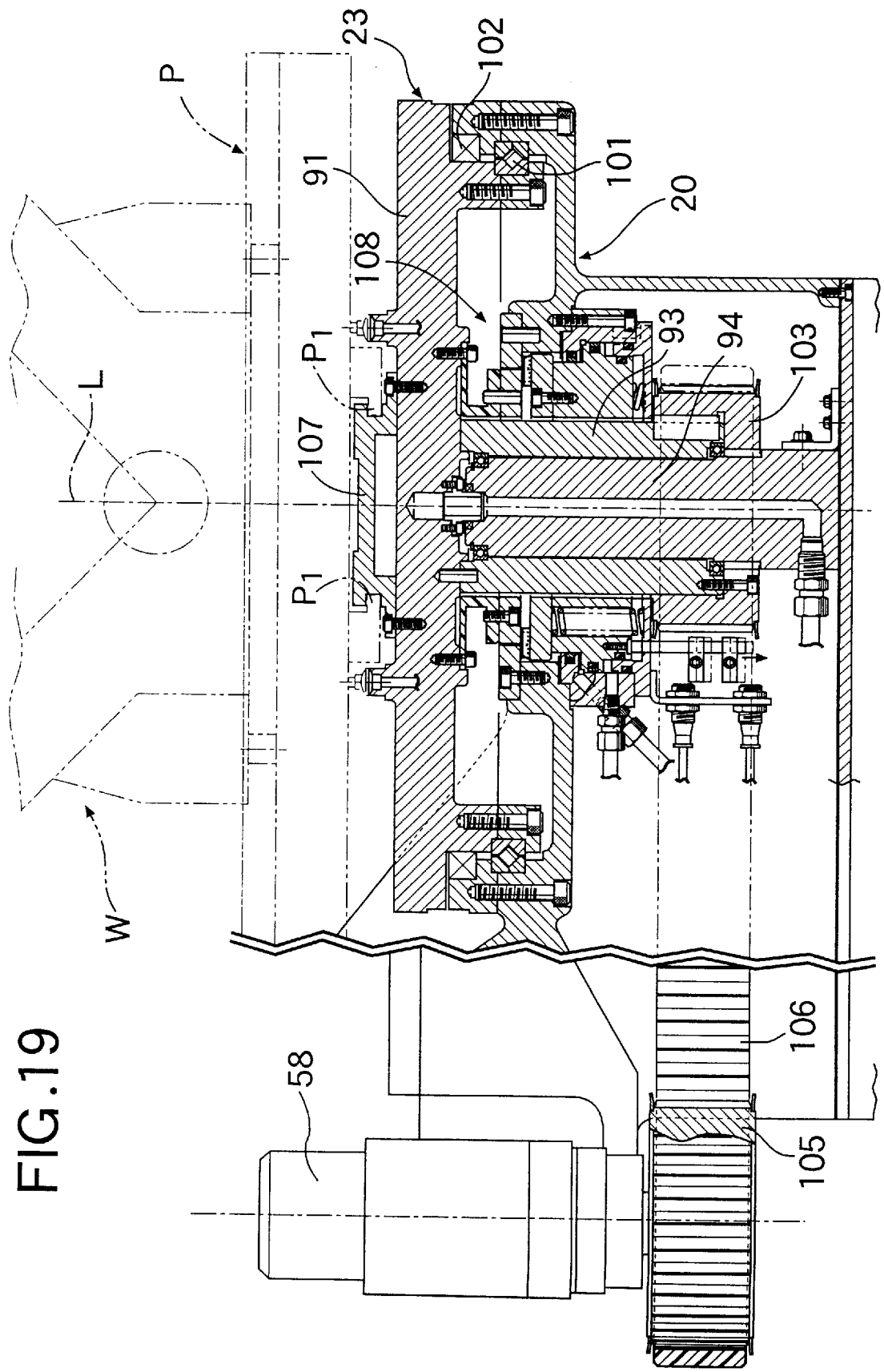
Figure 20:
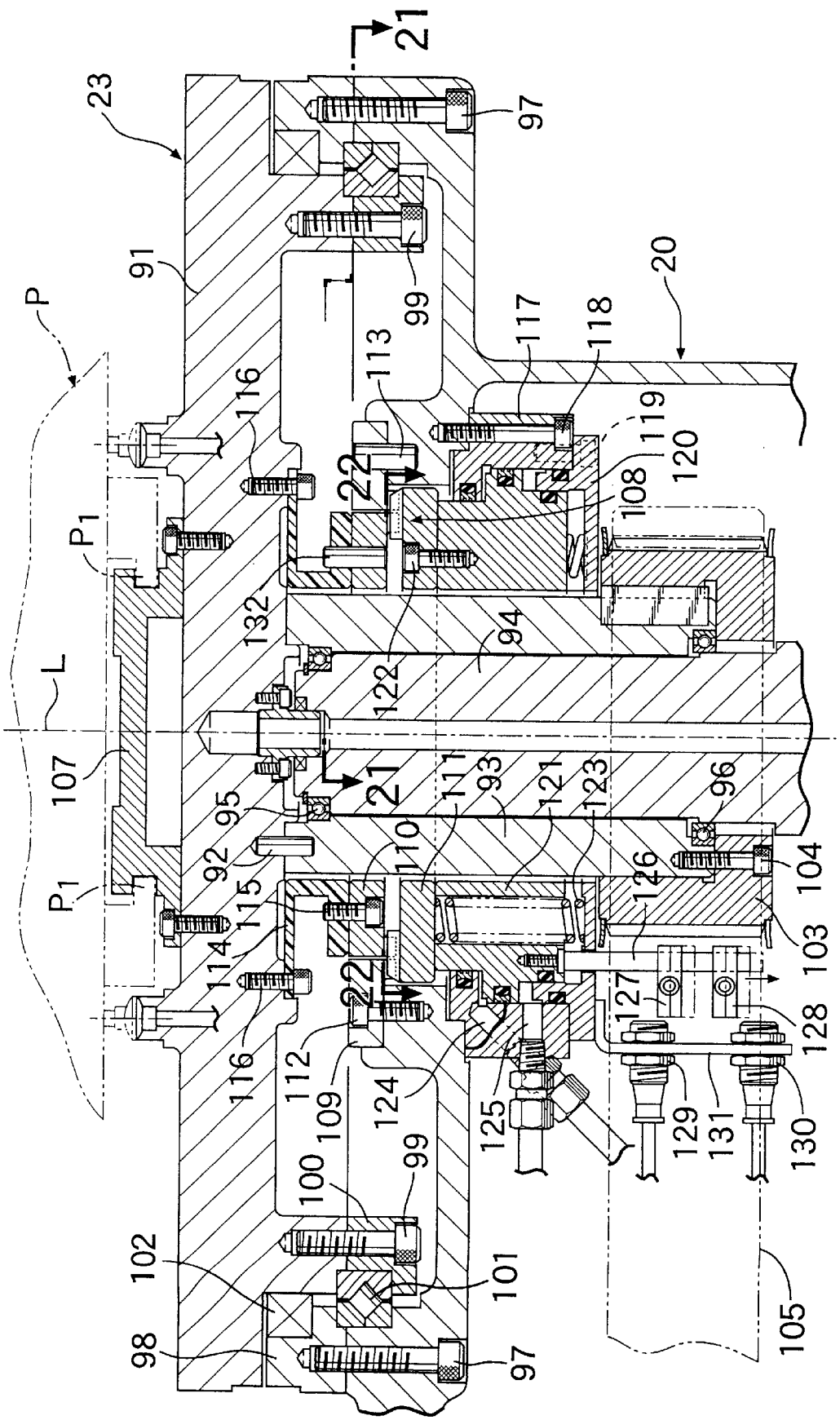
Figure 21:
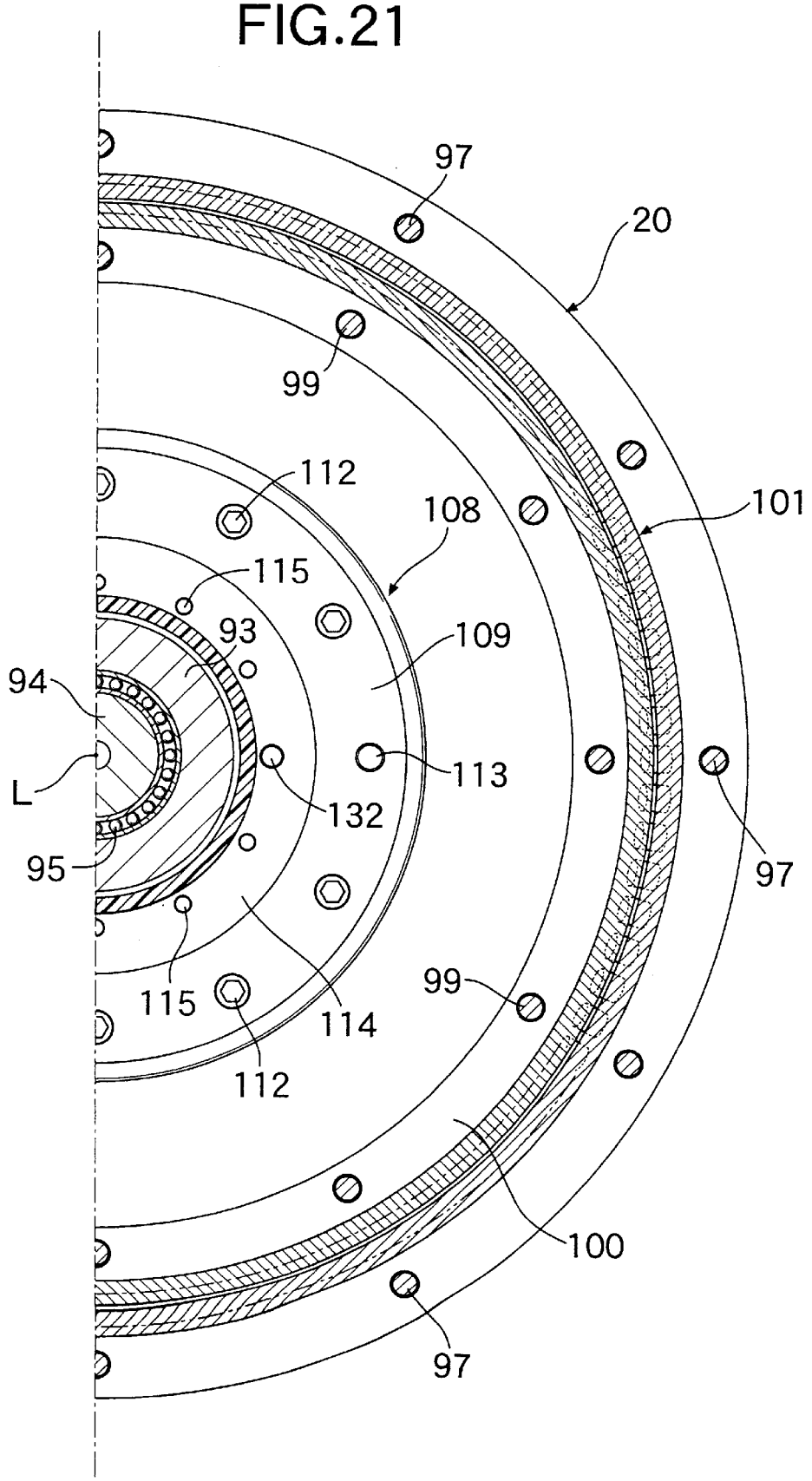
Figure 22:
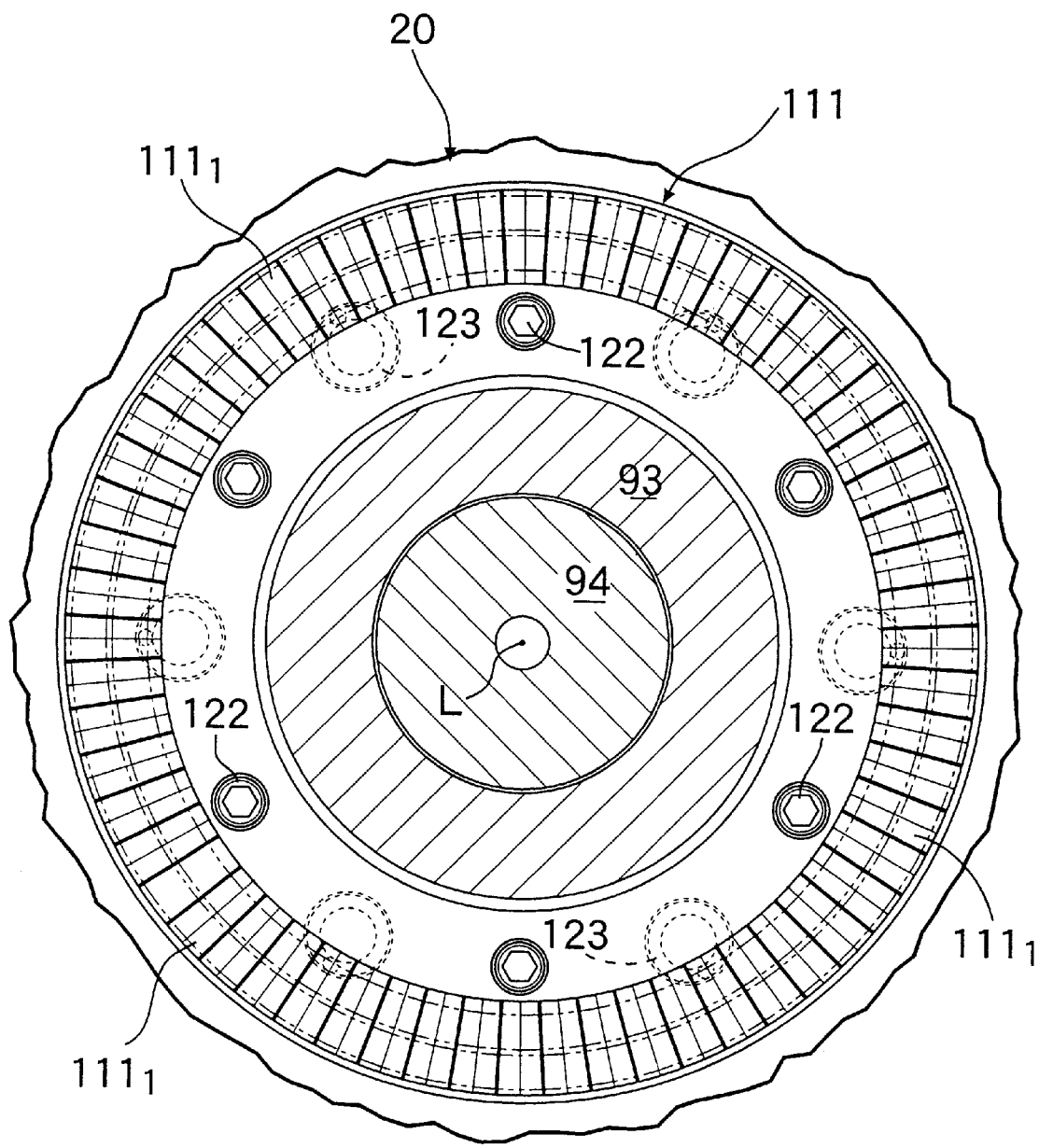
Figure 23:
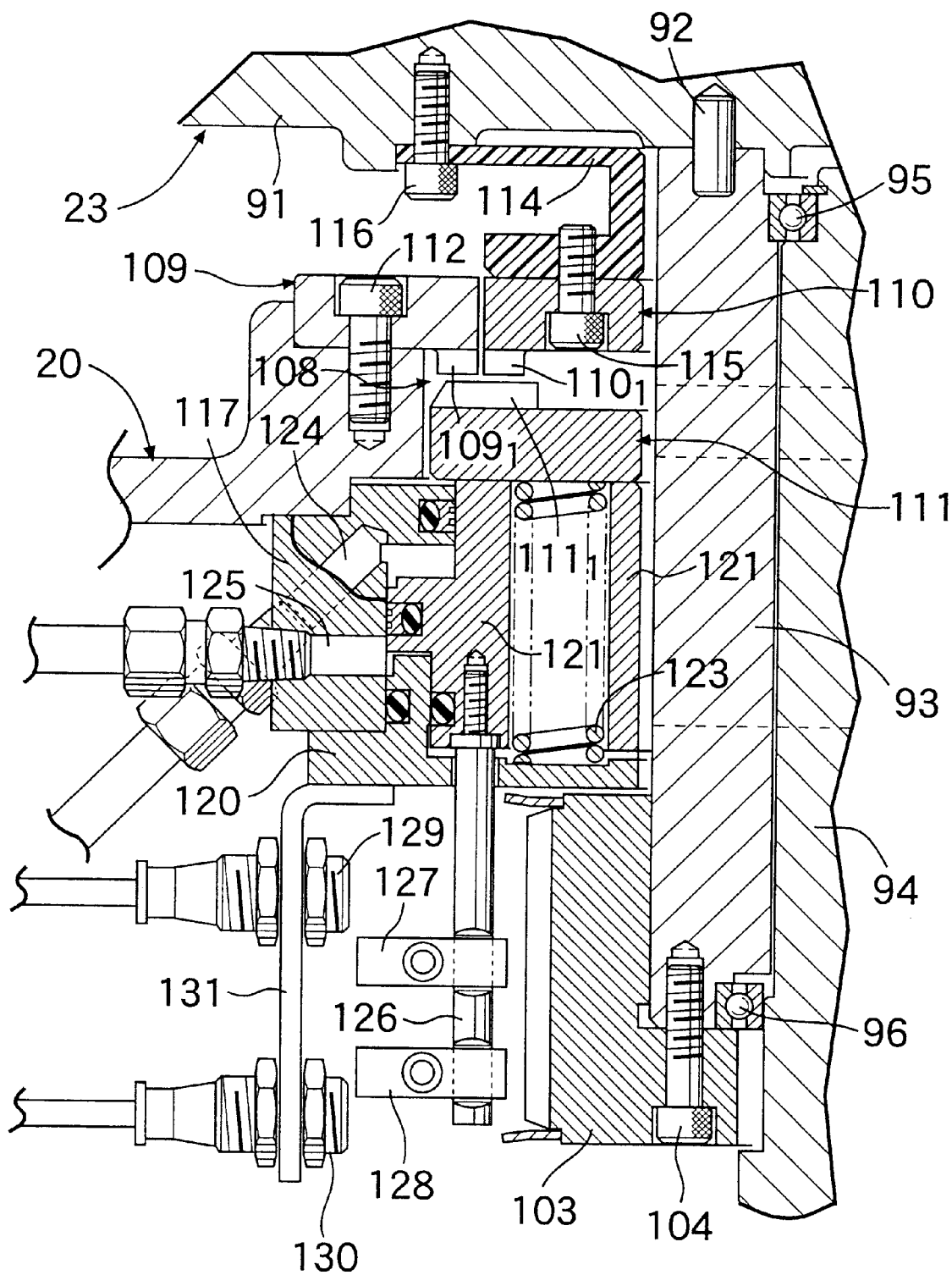
Figure 24:
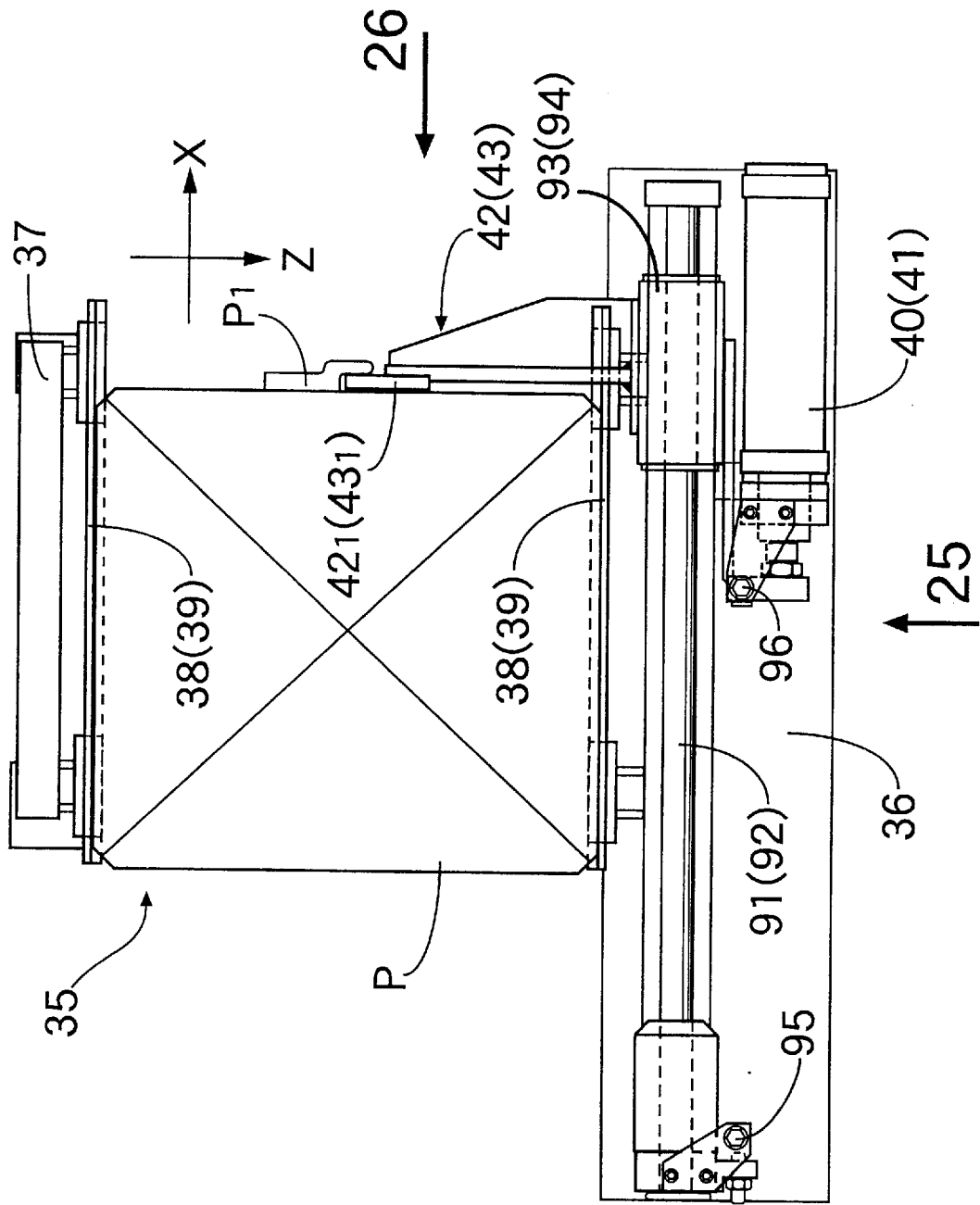
Figure 25:
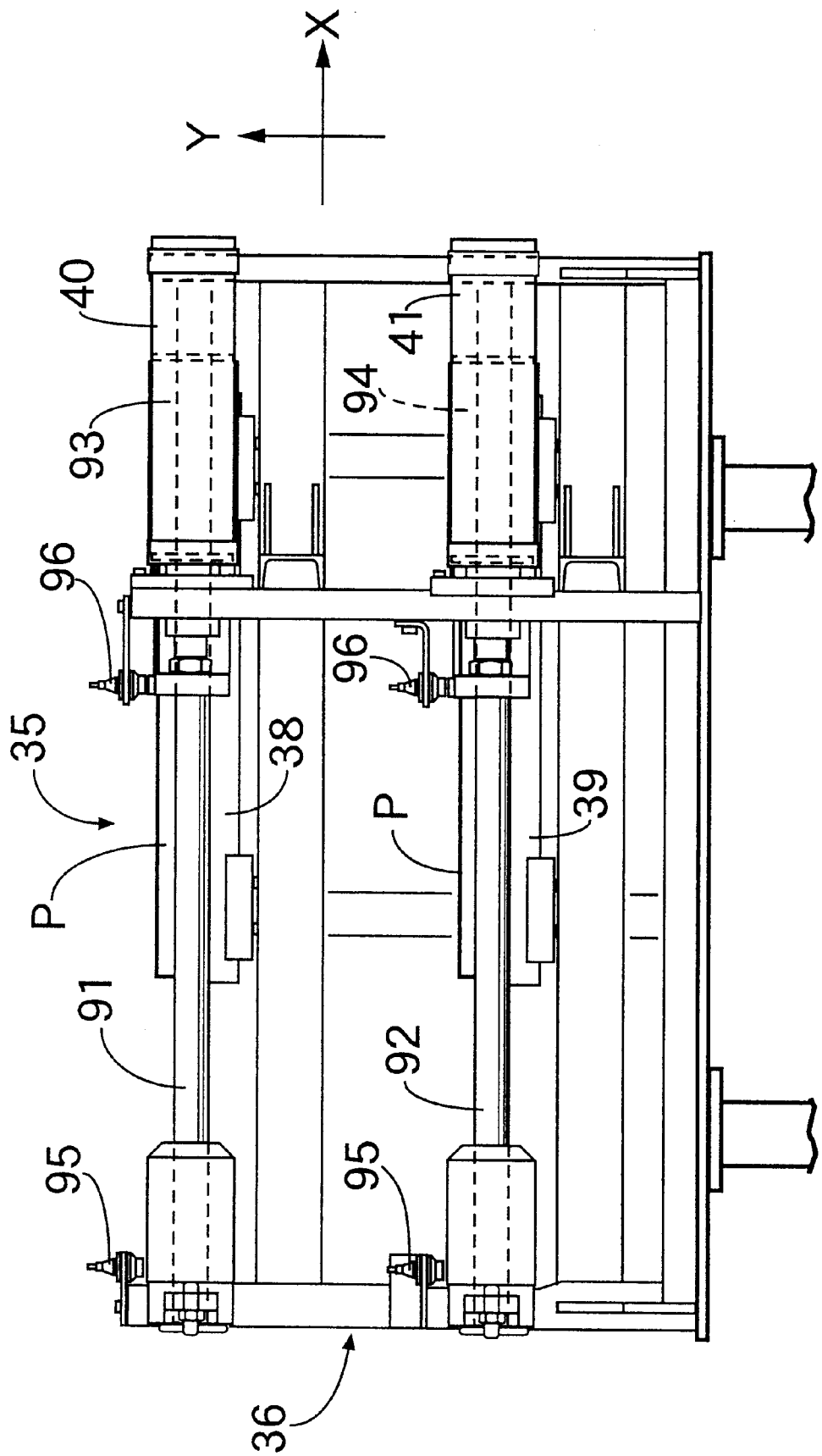
Figure 26:
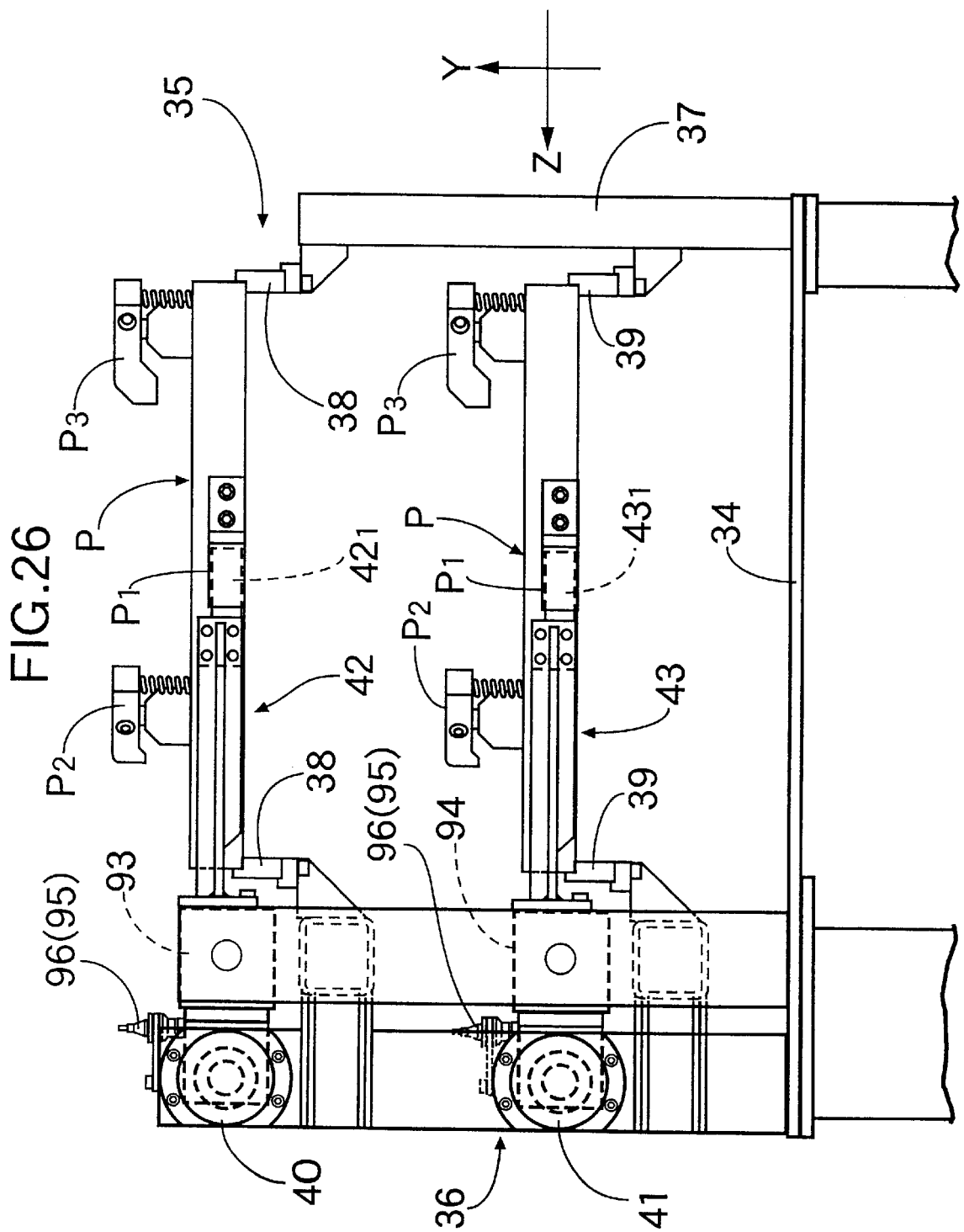
Figure 27:
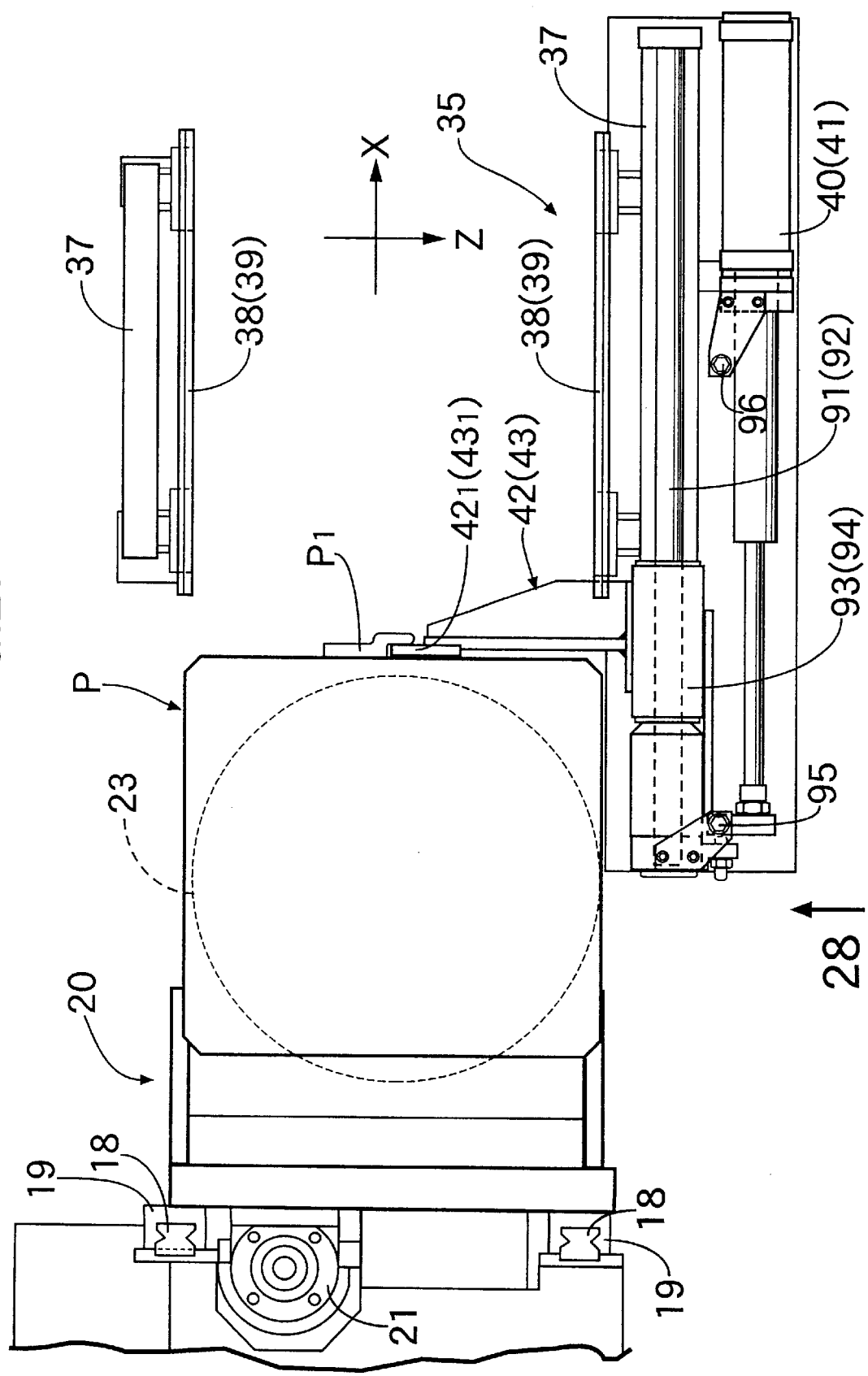

As shown in FIGS. 17 and 18, the cylinder block W is provided with four journal supporting portions $W_1$ for supporting a journal of a crankshaft, and a cap C is fastened to each of the journal supporting portions $W_1$ by two bolts B, B. Bottom holes h contoured by the tool T, are defined between the journal supporting portion $W_1$ and the cap C. The tool T includes a tool body $T_1$, formed into a shaft shape, the recess $T_2$ defined in the front end of the tool body $T_1$, the grasped portion $T_3$ grasped by the spindle 30, and four cutting blades c provided at predetermined distances on the tool body $T_1$. The four cutting blades c contour inner peripheral surfaces of the four bottom holes h, respectively. A radius Rc from the center Oc of the tool body $T_1$ to a tip end of the cutting blade c is smaller than a radius Rh of the bottom hole h, The operation of the embodiment of the present invention having the above-described arrangement will be described below.

First, the slide frame 48 of the tool changer 44 is moved in a direction toward the Z-axis table 26 by the servo motor 49 and then, the tool changer driving motor 50 is driven to drive the pair of endless chain 55, 55 in a circulating movement. The driving of the tool changer driving motor 50 is stopped in a position in which the chucks 56 and 57 grasping the tool T to be used, are opposed to the spindle 30 (in the tool-replacing position shown in FIG. 8). At this time, the annular groove $T_4$ in the grasped portion $T_3$ has been grasped by the rollers 115, 115 mounted at the tip ends of the pair of clamp arms 107, 107 of one of the chucks 56, and the small-diameter portion $T_4$ is grasped by the arcuate faces $125_1$, $125_1$ of the pair of clamp arms 125, 125 of the other chuck 57.

When the tool L is in a position other than the tool-replacing position, the cam follower 116 of the cam means 121 is spaced apart from the cam 119 provided on the slide frame 48. Therefore, the lock pin 111 of the locking means 120 has protruded from the lock pin housing 110, and the locking face $111_1$ at the tip end of the lock pin 111 has been inserted between the locked faces at the base ends of the pair of clamp arms 107, 107 (see a position shown by dashed line in FIG. 13). In this state, even if the tip ends of the clamp arms 107, 107 are intended to be moved to their opened positions, the locked faces $107_1$, $107_1$ of the clamp arms 107, 107 ire blocked by the locking face $111_1$ of the lock pin 111, whereby the clamp arms 107, 107 are retained in their locked states, and hence, the dropping of the tool T is prevented reliably.

When the chuck 56 grasping the tool T has reached the tool-replacing position, the cam follower 116 of the chuck 56 is put into abutment against the cam 119 provided on the slide frame 48, and the lock pin 111 of the locking means 120 is pushed into the lock pin housing 110 against the resilient force of the spring 112. Therefore, clearances α, α a are created between the locking face $111_1$ at the tip end of the lock pin 111 and the locked faces $107_1$, $107_1$ at the base ends of the pair of clamp arms 107, 107, respectively (see positions shown by solid lines in FIG. 13). In this state, the swinging movement of the clamp arms 107, 107 in opening directions is permitted in a range corresponding to each of the clearances α, α, until the locked faces $107_1$, $107_1$ are put into abutment against the locking face $111_1$.

Therefore, if the circulation of the endless chains 55, 55 is stopped at the time when the chuck 56 grasping a desired tool T reaches the tool-replacing position, the locking means 120 of the chuck 56 is unlocked automatically in the tool-replacing position. In this state, the Z-axis table 26 is moved forwards by the Z-axis servo motor 27, and the grasped portion $T_3$ at the rear end of the tool T is grasped by the spindle 30. When the tool changer 44 is then moved in a direction away from the Z-axis table 26, the clamp arms 107, 107 of the chuck 56 are forcibly opened against the resilient force of the spring 108 and at the same time, the clamp arms 125, 125 of the chuck 57 are forcibly opened against the resilient force of the spring 126, thereby permitting the tool T to be delivered from the tool changer 44 to the spindle 30.

When the empty chuck 56 has reached the tool-replacing position and the locking of the locking means 120 has been released, the circulation of the endless chains 55, 55 is stopped, and the tool changer 44 is moved toward the Z-axis table 26 by the servo motor 49. Thereupon, the clamp arms 107, 107 of the chuck 56 are forcibly opened against the resilient force of the spring 108 and at the same time, the clamp arms 125, 125 of the chuck 57 are forcibly opened against the resilient force of the spring 126, thereby permitting the tool T to be grasped by the chucks 56 and 57. When the Z-axis table 26 is then moved backwards by the Z-axis servo motor 27, the grasped portion $T_3$ is slipped off from the spindle 30, whereby the tool T is delivered to the tool changer 44.

As described above, when the chuck 56 of the tool changer 44 has reached the tool-replacing position, the locking of the locking means 120 is released automatically by cooperation with the cam means 121 without provision of a special actuator. Therefore, it is possible to deliver the tool T easily and reliably without bringing about an increase in number of parts and the cost.

Subsequently, the X-axis servo motor 16 is driven to move the X-axis table 15 in the direction of the X-axis, and the Y-axis servo motor 21 is driven to move the Y-axis table 20 in the direction of the Y-axis, thereby causing the bottom holes h in the cylinder block W supported on the Y-axis table 20 to be opposed to the tool T. When the Z-axis servo motor 27 is driven in this state to move the Z-axis table 26 in the direction of the Z-axis, the recess $T_2$ at the front end of the tool T passing through the bottom holes h in the cylinder block W, is fitted over the center member 68. When the recess $T_2$ of the tool T has been fitted over the center member 68, the opening in the air passage $68_1$ in the center member 68 is occluded. This inhibits the leakage of air supplied from the air pipe 82 to the air passage $67_1$ in the rotary shaft 67 and the air passage $68_1$ in the center member 68, whereby it is confirmed that the front end of the tool T has been supported on the tail support 33.

Thus, the four bottom holes h in the cylinder block W are contoured by the four cutting blades c of the tool T, respectively, while conducting a contouring control of driving the spindle driving motor 29 to rotate the tool T by the spindle 30, and reciprocally moving the Z-axis table 26 in the direction of the Z-axis by the Z-axis servo motor 27.

During this time, the center member 68 supporting the recess $T_2$ at the front end of the tool T and the rotary shaft 67 are dragged by the rotation of the tool T, so that they are rotated relative to the slide rod 63. The piston 73 slidably fitted in the cylinder 72 fixed to the tail-support supporting frame 31 is biased backwards toward the tool T by hydraulic pressure supplied through the first port 78, and the piston rod 74 connected to the piston 73, the slide rod 63, the rotary shaft 67 and the center member 68 are also biased backwards, so that the center member 68 can be reliably fitted into the recess $T_2$ in the tool T to follow the reciprocal movement of the tool T.

During rotation of the tool T by the spindle 30, the cylinder block W supported on the Y-axis table 20 is rotated eccentrically in an X-Y plane by reciprocally driving the X-axis servo motor 16 and the Y-axis servo motor 21 at the same time and with their phases offset from each other. Namely, the center Oh of the bottom hole h in the cylinder block W is rotated eccentrically on a circumference eccentric from the center Oc of the tool T by a distance d in FIG. 18. As a result, the cutting blade c of the tool T can contour the inner peripheral surface of the bottom hole h into a circular shape in cooperation with the reciprocal movement of the tool T in the direction of the Z-axis.

In this case, if the amplitudes of the X-axis table 15 and the Y-axis table 20 are changed, i.e., if the eccentric amount d in the eccentrically rotating movement of the center Oh of the bottom hole h in the cylinder block W is increased, the bottom hole h having any inside diameter can be contoured by a single type of a tool, leading to remarkably enhanced general-purpose properties. In addition, even if the cutting blade c of the tool T is worn and as a result, the radius Rc from the center Oc of the tool body $T_1$ to the tip end of the cutting blade c is decreased, the bottom hole h having a desired radius can be contour only by increasing the eccentric amount d in the eccentrically rotating movement by such a decrement. This can contribute to the prolongation of the life of the tool T.

The contouring of the bottom hole h in the cylinder block W as a workpiece by eccentrically rotating the cylinder block W on the X-Y plane has been described above, but the contouring of the inner peripheral surface of a hole having any shape can be performed by conducting the contouring control of moving the cylinder block W along any path on the X-Y plane.

Even if the tool T is intended to be flexed by a cutting resistance received by the cutting blade c from the cylinder block W in the eccentrically rotating movement of the tool T, the flexing of the tool T is prevented, leading to an enhanced processing accuracy, because the front end of the tool T, which is a free end, is radially immovably supported by the tail support 33. In addition, the tail-support supporting member 31 supporting the tail support 33 is fixed at its lower end to the bed 11 and at its upper end to the column 12 through the connecting member 32. Therefore, the tail-support supporting member 31 can be straddle-supported, leading to an enhanced rigidity, and the supporting of the free end of the tool T by the tail support 33 can be achieved effectively. Further, the turntable 23 can be mounted on the Y-axis table 20 to rotate the cylinder block W about the X-axis and hence, the cylinder block W can be processed from any direction of the outer periphery without mounting and removal of the cylinder block W to and from the Y-axis table 20.

If the type of the cylinder block W has been changed from a first type currently used to a second type, the pallet P for the first type on the turntable 23 is changed to a pallet P for the second type by the pallet changer 35. For example, the pallet P for the first type is stored on the upper stage of the pallet changer 35, and the pallet P for the second type is stored on the lower stage of the pallet changer 35.

For this purpose, first, the X-axis servo motor 16 is driven to move the X-axis table 15 in a direction toward the pallet changer 35, and at the same time, the Y-axis servo motor 21 is driven to move the Y-axis table 20 to the same level as the upper guide rails 38, 38 of the pallet changer 35, whereby the upper locking member 42 is brought into engagement with the pallet P on the turntable 23 mounted on the Y-axis table 20. When the upper cylinder 40 is driven in a contracted manner in this state to move the upper locking member 42, the pallet P on the turntable 23 is pulled by the upper locking member 42 and discharged onto the upper guide rails 38, 38. Subsequently, the Y-axis servo motor 21 is driven to move the Y-axis table 20 to the same level as the lower guide rails 39, 39 of the pallet changer 35, and the lower cylinder 41 is driven in an expanded manner to urge the pallet P by the lower locking member 43, thereby supplying the pallet P from the lower guide rails 39, 39 onto the turntable 23 mounted on the Y-axis table 20.

A second embodiment of the present invention will now be described with reference to FIGS. 19 to 23.

A turntable 23, on which a pallet P for supporting a cylinder block W is placed, and which is rotated about an axis extending the direction of the Y-axis, includes a disk-shaped turntable body 91, and a tubular rotary shaft 93 integrally coupled to the turntable body 91 on the rotational axis L through a knock pin 92. The rotary shaft 93 is fitted over an outer periphery of a stationary shaft 94 rising from the Y-axis table 20 and rotatably carried on a pair of ball bearings 95, 96. An angular roller bearing 101 and a seal member 102 are disposed between an annular bearing supporting member 98 fixed to the upper surface of the Y-axis table 20 by bolts 97 and an annular bearing supporting member 100 fixed to the lower surface of the turntable 23 by bolts 99. The turntable 23 is rotatably carried and axially located on the Y-axis table by the angular roller bearing 101.

The Y-axis table 20 constitutes a base in the present invention, and the angular roller bearing 101 constitutes a bearing in the present invention.

A follower pulley 103 is fixed to a lower end of the rotary shaft 93 of the turntable 23 by a bolt 104 and connected through a cog belt 105 to a driving pulley 104 which is fixed to an output shaft of the turntable driving motor 58 supported on the Y-axis table 20. Therefore, the turntable 23 can be rotated through the driving pulley 104, the cog belt 105 and the follower pulley 103 by driving the turntable driving motor 58.

A pallet supporting rail 107 is fixed to the upper surface of the turntable 23, and the pallet P is supported on the upper surface of the turntable 23 by slidable engagement of the engage members $P_1$, $P_1$ projectingly provided on the lower surface of the pallet P, with the pallet supporting rail 107.

A Curvic coupling 108 adapted to index the turntable 23 to a predetermined rotational angle with respect to the Y-axis table 20, to position the turntable 23 in a circumferential direction, includes a first coupling member 109, a second coupling member 110 and a third coupling member 111 which are disposed in concentric circular configurations around an outer periphery of the rotational axis L of the turntable 23. A large number of teeth $109_1$, a large number of teeth $110_1$ and a large number of teeth $111_1$ are provided on the coupling members 109, 110 and 111 all formed annularly, and extend radiantly about the rotational axis L.

The first coupling member 109 is fixed, with its teeth $109_1$ turned downwards, to the Y-axis table 20 through bolts 112 and knock pins 113. The second coupling member 110 is fixed, with its teeth $110_1$ turned downwards, to a lower surface of a resilient member 114 formed into a J-disk shape in section from synthetic resin through bolts 115 and knock pins 132, and an upper surface of the resilient member 114 is fixed to the lower surface of the turntable 23.

A cylinder 117 is fixed to the Y-axis table 20 by bolts 118 to surround the rotary shaft 93 of the turntable 23, and has a lower end which is covered by a cylinder head 120 fixed by bolts 119. An annular piston 121 is vertically slidably fitted in the cylinder 117, and the third coupling member 111 is fixed to an upper surface of the piston 121 by bolts 122. The teeth $111_1$ provided on an upper surface of the third coupling member 111 are engageably opposed to the teeth $109_1$ and $110_1$ provided on lower surfaces of the first and second coupling members 109 and 110.

The piston 121 is biased, by coil springs 123 mounted under compression between the piston 121 and the cylinder head 120, in such a direction that the third coupling member 111 is brought into the first and second coupling members 109 and 110. A first port 124 and a second port 125 are defined in the upper and lower surfaces of the piston 121, respectively. Thus, when hydraulic pressure is supplied to the first port 124, the piston 121 is lowered against the resilient force of the Curvic coupling 108 to release the engagement of the Curvic coupling 108, and when the hydraulic pressure is supplied to the second port 125, the piston 121 is lifted by such hydraulic pressure and the resilient force of the coil spring 123 to bring the Curvic coupling into an engaged state. The coil spring 123 functions as a safety device which retains the Curvic coupling 108 in the engaged state, when a hydraulic system fails.

A pair of upper and lower dogs 127 and 128 are fixed to a rod 126 which is fixed to the lower surface of the piston 121 to extend downwards through the cylinder head 120, and a pair of upper and lower sensors 129 and 130 capable of detecting the dogs 127 and 128, are mounted on a stay 131 fixed to the cylinder head 120. When the upper dog 127 has been detected by the upper sensor 129, the piston 121 is in an upper limit position to stop the supplying of the hydraulic pressure to the second port 125. When the lower dog 128 has been detected by the lower sensor 130, the piston 121 is in a lower limit position to stop the supplying of the hydraulic pressure to the first port 124.

The operation of the second embodiment of the present invention having the above-described arrangement will be described below.

To index the turntable 23 by the Curvic coupling 108 to position it in a circumferential direction, the hydraulic pressure is first supplied to the first port 124 to lower the third coupling member 111 along with the piston 121 against the resilient force of the coil springs 123, thereby disengaging the teeth $111_1$ of the third coupling member 111 from the teeth $109_1$ and $110_1$ of the first and second coupling members 109 and 110 to provide a state in which the turntable 23 can be rotated freely. Then, the rotary shaft 93 is driven through the driving pulley 105, the cog belt 106 and the follower pulley 103 by the turntable driving motor 58, thereby rotating the turntable 23 integral with the rotary shaft 93 to a predetermined rotated position.

Subsequently, when hydraulic pressure is supplied to the second port 125 to lift the third coupling member 111 along with the piston 121 by the resilient force of the coil springs 123 and such hydraulic pressure, the teeth $111_1$ of the third coupling member 111 are brought into engagement with the teeth $109_1$ and $110_1$ of the first and second coupling members 109 and 110. As a result, the second coupling member 110 mounted on the turntable 23 is coupled to the Y-axis table 20 through the third coupling member 111 and the first coupling member 109, whereby the turntable 23 is positioned in the circumferential direction relative to the Y-axis table 20.

The teeth $109_1$, $110_1$ and $111_1$ of the first, second and third coupling members 109, 110 and 111 are formed radiantly and hence, the third coupling member 111 is automatically aligned with the first coupling member 109 firmly fixed to the Y-axis table 20, and the second coupling member 110 is automatically aligned with the third coupling member 111. At this time, when the second coupling member 110 connected to the turntable body 91, is intended to move radially by the aligning effect, a radial load is applied to the angular roller bearing 101, because the turntable body 91 of the turntable 23 is radially immovably supported on the Y-axis table 20 with angular roller bearing 101 interposed therebetween.

According to this embodiment, however, even if the second coupling member 110 is moved radially by the aligning effect of the Curvic coupling 108, the radial movement of the second coupling member 110 can be absorbed by the resilient deformation of the resilient member 114 interconnecting the second coupling member 110 and the turntable 91, thereby reliably preventing the radial load from being applied to the angular roller bearing 101. Thus, it is possible to accurately index the turntable 23 by the Curvic coupling 108 without the influence of the radial load produced by the aligning effect to the angular roller bearing 101, and moreover, it is possible to avoid a reduction in durability of the angular roller bearing 101 and Curvic coupling 108 due to the radial load.

A third embodiment of the present invention will now be described with reference to FIGS. 24 to 28.

A pallet changer 35 is mounted on an upper surface of a support base 34 mounted on one side of the bed 11, so as to transport a pallet P to and from the turntable 23 on the Y-axis table 20. The pallet c hanger 35 is constructed with two vertical stages. A pair of upper guide rails 38, 38 and a pair of lower guide rails 39, 39 are mounted on a first rail support 36 and a second rail support 37. An upper cylinder 40 and a lower cylinder 41 are mounted on the first rail support 36, so that an upper locking member 42 and a lower locking member 43 capable of being brought into engagement with a pallet P, are reciprocally driven in the direction of the X-axis by the upper cylinder 40 and the lower cylinder 41, respectively.

More specifically, slide guides 93 and 94 are slidably carried respectively on an upper guide rod 91 and a lower guide rod 92 which are mounted on the first rail support 36 to extend in the direction of the X-axis. The upper locking member 42 is mounted on the upper slide guide 93 connected to the upper cylinder 40, and the lower locking member 43 is mounted on the lower slide guide 94 connected to the lower cylinder 41. The advancing movement ends of the upper and lower locking members 42 and 43, are detected by sensors 95, 95, and the retracting movement ends of the upper and lower locking members 42 and 43, are detected by sensors 96, 96.

A locked member $P_1$ is mounted on one side of the pallet P opposed to the pallet changer 35, and is capable of being engaged with an engage portion $42_1$ or $43_1$ at a tip end of the upper locking member 42 or the lower locking member 43, and a plurality of clamp members $P_2$, $P_3$ for clamping a peripheral edge of a cylinder block W, are mounted on an upper surface of the pallet P. The engage portions $42_1$ and $43_1$ of the locking members 42 and 43 are capable of being passed without being engaged with the engaged portion $P_1$ of the pallet P in the direction of the Y-axis, but is capable of being engaged with the engaged portion $P_1$ of the pallet P in the direction of the X-axis.

The upper guide rails 38, 38 and the lower guide rails 39, 39 constitute a pallet support of the present invention; the upper cylinder 40 and the lower cylinder 41 constitute a driving source of the present invention, and the turntable 23 constitutes a pallet supporting table of the present invention. In this embodiment, the upper stage of the pallet changer 35 is used for supplying and discharging of the pallet P for the firs type of cylinder block W, and the lower stage is used for supplying and discharging of the pallet P for the second type of cylinder block W.

The operation of the third embodiment of the present invention having the above-described arrangement will be described below.

Suppose that the first type of cylinder block W is now being processed, and a pallet P for the first type for supporting the cylinder block W has been removed from the upper stage of the pallet changer 35 and is supported on the turntable 23. In this case, when the type of the cylinder block W to be processed from this state has been changed from the first type to the second type, it is required that the pallet P for the first type on the turntable 23 is returned to the upper stage of the pallet changer 35, and in place of this pallet P, the pallet P for the second type is supplied from the lower stage of the pallet changer 35 onto the turntable 23.

For this purpose, the upper locking member 42 at the upper stage of the pallet changer 35 which is now in an empty state, is moved toward the Y-axis table 20 by driving the upper cylinder in an expanding manner and left on standby on the Y-axis table 20. At this time, the pallet P supported on the turntable 23 is in an empty state, as result of discharging of the processed cylinder block W from the pallet P by a loader 143. When the Y-axis table 20 having the empty pallet P placed thereon is moved toward the pallet changer 35 and then lifted or lowered, so that the level of the turntable 23 coincides with the level of the upper guide rails 38, 38, the locked portion $P_1$ of the pallet P is automatically brought into engagement with the engage portion $42_1$ of the upper locking member 42 (see FIGS. 27 and 28). Therefore, if the upper cylinder 40 is driven in a contracted manner, the locked portion $P_1$ can be pulled by the upper locking member 42, whereby the pallet P can be discharged from the turntable 23 onto the upper guide rails 38, 38.

Subsequently, the Y-axis table 20 is lowered and stopped at a position in which the turntable 23 is at the same level as the lower guide rails 39, 39, and then, the lower cylinder 41 is driven in an expanded manner. As a result, the pallet P with the locked member $P_1$ pushed by the lower locking member 43, is pushed out from the lower guide rails 39, 39 onto the turntable 23. Subsequently, if the Y-axis table 20 is lifted or lowered, the locked member $P_1$ of the pallet P is automatically disengaged from the lower locking member 43 and hence, the X-axis servo motor 16 can be driven to move the Y-axis table 20 away from the pallet changer 35 to the processing position.

When the type of the cylinder block W to be processed has been changed from the second type to the first type, the pallet P for the second type on the turntable 23 may be returned to the lower stag, of the pallet changer 35 and in place of this pallet P for the second type, the pallet P for the first type may be supplied from the upper stage of the pallet changer 35 onto the turntable 23.

In the above manner, the engagement and disengagement of the locked member $P_1$ of the pallet P with and from the upper locking member 42 and the lower locking member 43 can be conducted by utilizing the movements of the Y-axis table 20 in the direction of the X-axis and in the direction of the Y-axis. Therefore, it is unnecessary to conduct the engagement and disengagement using a special actuator, leading to a simplified structure.

The cylinder block W has been illustrated as a workpiece in the first embodiment, but the present invention is applicable to the processing of any other workpiece. If a milling tool is used, the milling of an end face of a workpiece can be carried out.

The upper end of the tail-support supporting member 31 has been connected to the column 12 through the connecting member 23 in the first embodiment, but may be connected directly to the column 12.

Additionally, the front and rear portions of the single tool T have been grasped by the pair of chucks 56 and 57 in the first embodiment, but the chuck 57 having no locking means 120 can be omitted. Alternatively, the locking means 120, 120 can be provided on the chucks 56 and 57, respectively.

The first coupling member 109 integral with the Y-axis table 20 is disposed on the radially outer side and the second coupling member 110 integral with the turntable 23 is disposed on the radially inner side in the second embodiment, but they may be disposed in a positional relationship opposite to that described above.

In addition, the bearing (the angular roller bearing 101) supporting the turntable 23 is disposed on the radially outer side of the Curvic coupling 108 in the second embodiment, but may be disposed on the radially inner side or on the radially opposite sides of the Curvic coupling 108. The resilient member 114 is made of synthetic resin in the embodiment, but the material for the resilient member 114 is not limited to synthetic resin.

Further, the pallet changer 35 is constructed in the two stages in the third embodiment, but if the pallet changer 35 is constructed in three stages, the cycle time can be further reduced.

Although the embodiments of the present invention have been described in detail, it will be understood that the present invention is not limited to the above-described embodiments, and various modifications in design may be made without departing from the spirit and scope of the invention defined in claims.

What is claimed is:

1. A machining centre comprising a bed, a column rising from the bed, an X-axis table carried on the column for reciprocally moving in the direction of an X-axis, a Y-axis table carried on the X-axis table for reciprocally moving in the direction of a Y-axis perpendicular to the direction of the X-axis, the Y-axis table releasably capable of supporting a workpiece, a Z-axis table carried on the column for reciprocally moving in the direction of a Z-axis perpendicular to the directions of the X-axis and the Y-axis, a spindle supported on the Z-axis table for rotating a tool about an axis extending in the direction of the Z-axis, a tail-support supporting member rising from the bed, and a tail support mounted on the tail-support supporting member for supporting a free end of the tool supported on the spindle.

2. A machining centre according to claim 1, wherein the Y-axis table includes a turntable for supporting the workpiece thereon and the turntable being rotated about an axis extending in the direction of the Y-axis.

3. A contouring process using a machine centre including a bed, a column rising from the bed, an X-axis table carried on the column for reciprocally moving in the direction of an X-axis, a Y-axis table carried on the X-axis table for reciprocally moving in the direction of a Y-axis perpendicular to the direction of the X-axis, the Y-axis table releasably capable of supporting a workpiece, a Z-axis table carried on the column for reciprocally moving in the direction of a Z-axis perpendicular to the directions of the X-axis and the Y-axis, a spindle supported on the Z-axis table for rotating a tool about an axis extending in the direction of the Z-axis, a tail-support supporting member rising from the bed, and a tail support mounted on the tail-support supporting member for supporting a free end of the tool supported on the spindle, the machine centre used for contouring an inner periphery of a bottom hole of the workpiece using the tool, the process comprising the steps of:

rotating the tool supported on the spindle about the axis extending in the direction of the Z-axis, and driving the X-axis table and the Y-axis table to move the workpiece in an X-Y plane.

4. A tool supporting structure in a machine tool comprising a bed, a column rising from the bed, a rotatable spindle for rotating a tool, said spindle being movably mounted for movement relative to the column in at least one direction, a tail-support supporting member rising from the bed, a tail support mounted on the tail-support supporting member, wherein an upper end of the tail-support supporting member is connected to the column, and wherein the tool is supported by the tail support.

5. A contouring process using a machine centre including a bed, a column rising from the bed, an X-axis table carried on the column for reciprocally moving in the direction of an X-axis, a Y-axis table carried on the X-axis table for reciprocally moving in the direction of a Y-axis perpendicular to the direction of the X-axis, the Y-axis table releasably capable of supporting a workpiece, a Z-axis table carried on the column for reciprocally moving in the direction of a Z-axis perpendicular to the directions of the X-axis and the Y-axis, a spindle supported on the Z-axis table for rotating a tool about an axis extending in the direction of the Z-axis, a tail-support supporting member rising from the bed, a tail support mounted on the tail-support supporting member for supporting a free end of the tool supported on the spindle and a turntable on the Y-axis table for supporting the workpiece thereon and for being rotated about an axis extending in the direction of the Y-axis, the machine centre used for contouring an inner periphery of a hole of the workpiece using the tool, the process comprising the steps of:

rotating the tool supported on the spindle about the axis extending in the direction of the Z-axis, and driving the X-axis table and the Y-axis table to move the workpiece in an X-Y plane.

* * * * *